(12) United States Patent
Tsuchiya et al.

(10) Patent No.: US 11,490,396 B2
(45) Date of Patent: Nov. 1, 2022

(54) METHOD AND DEVICE FOR SELECTING A CHANNEL BASED ON INTERFERENCE AND POSITION INFORMATION

(71) Applicant: CANON KABUSHIKI KAISHA, Tokyo (JP)

(72) Inventors: Keigo Tsuchiya, Tokyo (JP); Ayumi Kabata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 111 days.

(21) Appl. No.: 16/937,765

(22) Filed: Jul. 24, 2020

(65) Prior Publication Data

US 2021/0037540 A1 Feb. 4, 2021

(30) Foreign Application Priority Data

Jul. 31, 2019 (JP) .............................. JP2019-141684

(51) Int. Cl.
*H04W 72/08* (2009.01)
*H04W 16/14* (2009.01)
*H04W 72/04* (2009.01)
*H04W 72/02* (2009.01)
*H04B 17/336* (2015.01)

(52) U.S. Cl.
CPC ........ *H04W 72/082* (2013.01); *H04B 17/336* (2015.01); *H04W 16/14* (2013.01); *H04W 72/02* (2013.01); *H04W 72/0453* (2013.01)

(58) Field of Classification Search
CPC ... H04W 72/082; H04W 16/14; H04W 72/02; H04W 72/0453; H04W 72/046; H04W 16/18; H04W 72/04; H04B 17/336
See application file for complete search history.

(56) References Cited

U.S. PATENT DOCUMENTS 8,400,938 B2  3/2013  Matsuura
2003/0016770 A1*  1/2003  Trans ...................... H04B 3/32
375/346

(Continued)

FOREIGN PATENT DOCUMENTS

JP        2010-278825 A    12/2010

*Primary Examiner* — Mewale A Ambaye
(74) *Attorney, Agent, or Firm* — Venable LLP

(57) ABSTRACT

A communication apparatus that performs wireless communication obtains information of a channel with a possibility of interference in wireless communication that is output based on position information of the communication apparatus, position information of a source of a radio wave which has a possibility of interference in the wireless communication, and time information, and selects a channel to be used in the wireless communication. Whether a channel corresponding to the obtained channel information is the currently selected channel is determined, and the currently selected channel is changed to a channel other than the channel corresponding to the obtained channel information if the channel corresponding to the obtained channel information is the same channel as the currently selected channel. If communication is being performed, it is determined after the communication whether the channel corresponding to the obtained channel information is the same channel as the currently selected channel.

15 Claims, 19 Drawing Sheets

(56) References Cited

U.S. PATENT DOCUMENTS

| | | | |
|---|---|---|---|
| 2006/0029147 A1* | 2/2006 | Tsatsanis | H04W 52/42 |
| | | | 375/267 |
| 2009/0110033 A1* | 4/2009 | Shattil | H04B 1/7174 |
| | | | 375/147 |
| 2009/0111463 A1* | 4/2009 | Simms | H04W 16/14 |
| | | | 455/424 |
| 2018/0184457 A1* | 6/2018 | Islam | H04B 7/0697 |
| 2020/0229205 A1* | 7/2020 | Bharadwaj | H04W 72/02 |
| 2020/0351959 A1* | 11/2020 | Lee | H04L 1/1819 |
| 2021/0219283 A1* | 7/2021 | Xue | H04W 28/26 |

\* cited by examiner

F I G. 2
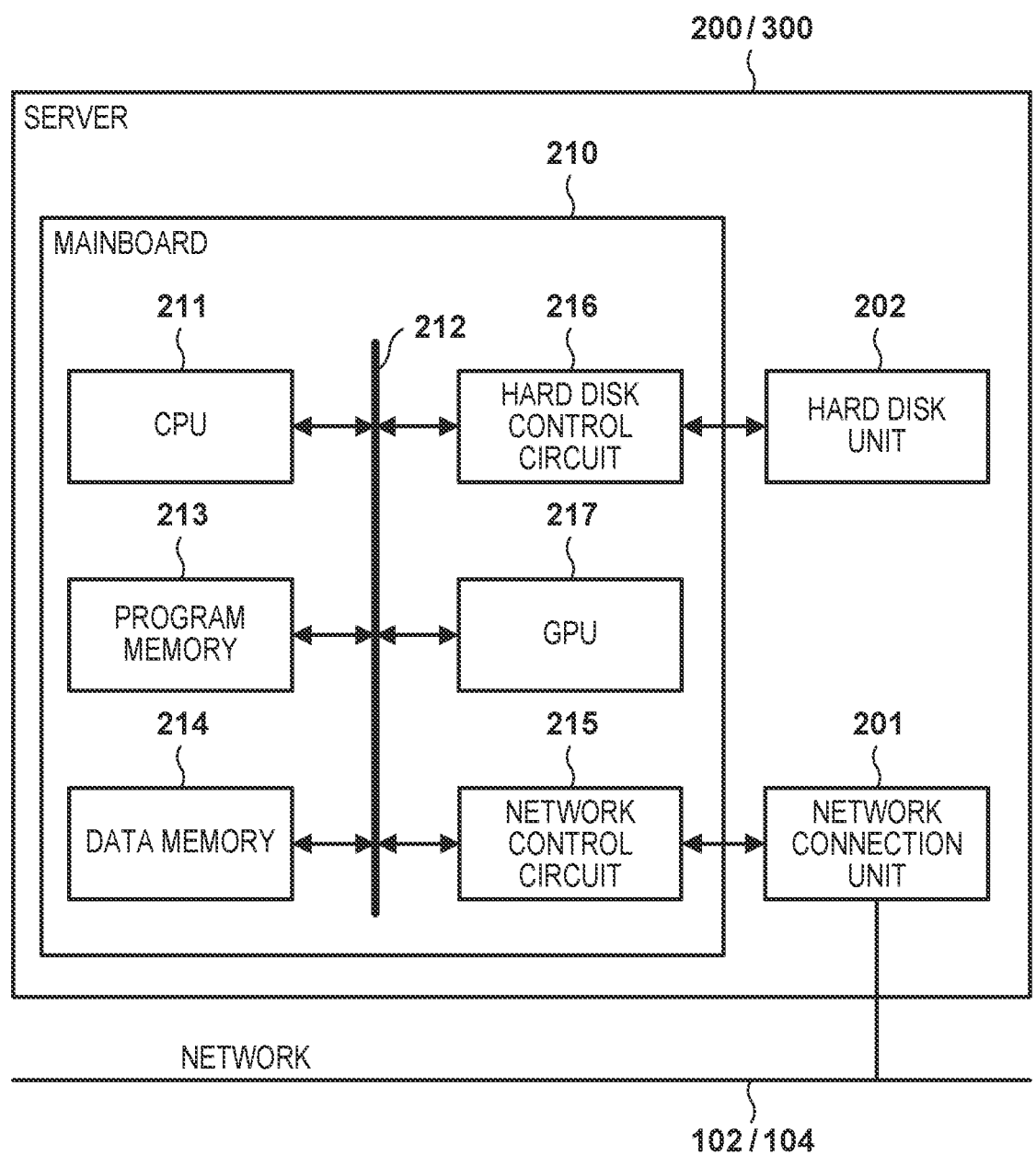

METHOD AND DEVICE FOR SELECTING A CHANNEL BASED ON INTERFERENCE AND POSITION INFORMATION

BACKGROUND OF THE INVENTION

Field of the Invention

The present invention relates to a communication technique.

Description of the Related Art

Conventionally, a wireless LAN system is used as a network system which is not restricted by a communication cable and has good portability. Particularly, in recent years, the wireless LAN system has spread drastically due to improvements in the transmission speed between wireless communication sections, the spread of wireless communication apparatuses, and the like. In recent years, a wireless LAN system defined in compliance with IEEE802.11 standards has become widespread in general as a wireless LAN system using the frequency bands of the 2.4 GHz band and the 5 GHz band. In particular, as exchange of large capacity data such as a moving image and the like has become mainstream, communication at 5 GHz, which is capable of higher speed communication than 2.4 GHz, has become mainstream.

However, it is necessary to pay attention to DFS (Dynamic Frequency Selection) in the use of the 5 GHz band. In a case in which a communication apparatus is to operate as a wireless base station (master station), monitoring of interference waves needs to be performed constantly so the wireless infrastructure communication which is in use will not influence the weather radar and the like. If an interference wave is detected, the channel that is being used must be quickly switched to another free channel. Japanese Patent Laid-Open No. 2010-278825 discloses a technique in which a channel is automatically changed to another free channel in a case in which radio waves of various kinds of radar such as the weather radar and the like are detected in a wireless base channel in wireless communication in the 5 GHz band and the communication needs to be interrupted for a predetermined time. This technique is DFS. Additionally, since there is also a radio interference avoidance function called TPC (Transmit Power Control) in addition to DFS, it is necessary to pay attention to TPC in a similar manner as well. W52, W53, W56, W58, and the like are bands used in the 5 GHz band, and usable bands are regulated in accordance with the law of the country or the region. Among these, W53 and W56 are the bands (DFS bands) in which DFS is executed.

For example, in Japan, W52 (5.2 GHz band (5150 to 5250 MHz)), W53 (5.3 GHz band (5250 to 5350 MHz)), and W56 (5.6 GHz band (5470 to 5725 MHz)) are set as the usable bands in the 5 GHz band. W52 is the only band (non-DFS band) that does not receive the interference wave due to DFS. For example, W52 uses channels 36, 40, 44, and 48.

SUMMARY OF THE INVENTION

In a case in which a communication apparatus is to operate as a wireless base station in the DFS band, the communication apparatus is required to constantly monitor and detect the band used by designated radar waves such as the weather radar and the like, and to immediately change the channel in use if radio interference is detected in the channel in use. However, reconnection processing is required to change channels and restart wireless communication, and this can take time until communication is restarted. In addition, since it is problematically impossible to predict when the radio interference will be generated, the communication speed will degrade and the communication will need to be disconnected even if communication is being executed when an interference wave is detected.

The present invention provides a technique for reducing radio interference by predicting, in advance, the information of a channel in which interference can be generated.

According to the first aspect of the present invention, a communication apparatus that performs wireless communication using a channel of a plurality of channels, comprising: an obtainment unit configured to obtain information of a channel with a possibility of interference in wireless communication that is output based on position information of the communication apparatus, position information of a source of a radio wave which has a possibility of interference in the wireless communication, and time information; and a selection unit configured to select, based on the obtained channel information, a channel to be used in the wireless communication is provided.

According to the second aspect of the present invention, a communication system comprising: a wireless communication apparatus configured to perform wireless communication as a master station in a wireless LAN; a training unit configured to generate a trained model for estimating an output; and an estimation unit configured to perform estimation by using the trained model, wherein the training unit generates the trained model by using, as input data, position information, position information of a source of an interference wave, a time, a target channel, and information indicating presence/absence of interference wave, using, as supervised data, information of a channel in which the interference wave has been generated, and optimizing a training model so as to minimize a shift between the supervised data and information of a channel in which the interference wave is generated that has been estimated from the input data, and the estimation unit estimates the information of the channel in which the interference wave is generated by using, as the input data, position information of the wireless communication apparatus, position information of a closest source of the interference wave to the wireless communication apparatus, and the time is provided.

According to the present invention, it is possible to reduce radio interference by predicting, in advance, the information of a channel in which radio interference may be generated and controlling a channel in use.

Further features of the present invention will become apparent from the following description of exemplary embodiments with reference to the attached drawings.

BRIEF DESCRIPTION OF THE DRAWINGS

FIG. 2 is a block diagram showing the arrangement of a cloud server 200 and an edge server 300;

FIG. 13 is a flowchart showing setup processing during powering-on;

DESCRIPTION OF THE EMBODIMENTS

Figure 1:
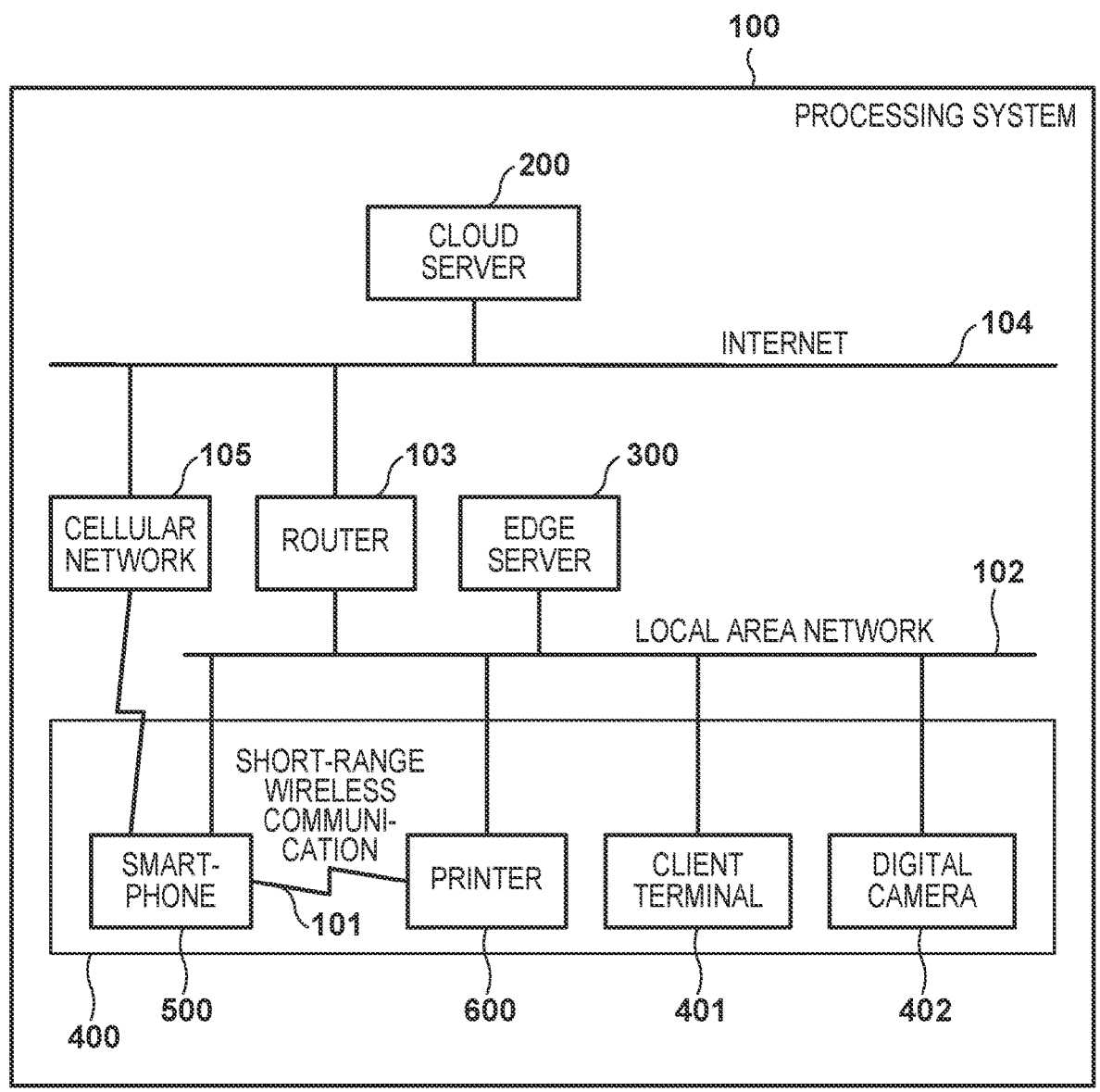
FIG. 1 is a block diagram showing the arrangement of a processing system 100 according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A communication apparatus (particularly, a wireless communication apparatus) according to this embodiment will be described. Although a router which has a wireless LAN access point (to be also referred as a wireless LAN master station or simply as a master station hereinafter) function is exemplified as the communication apparatus in this embodiment, the present invention is not limited to this. Various kinds of apparatuses are applicable as the communication apparatus as long as it is an apparatus that can execute communication with an information processing apparatus such as a server, a terminal apparatus, or the like via a wireless LAN. For example, the communication apparatus may be a wireless LAN access point that does not have a function as a router, a terminal apparatus that has a wireless communication function, or the like. In addition, the communication apparatus may be an apparatus that supports a wireless communication function, for example, a copy machine, a facsimile device, a smartphone, a mobile phone, a PC, a tablet terminal, a PDA, a digital camera, a music playback device, a storage device, a projector, a smart speaker, or the like. Note that a smart speaker is an apparatus for instructing processing to another device present on the same network in accordance with the voice of a user and for notifying the user of information obtained via the network in correspondence with the voice of the user. A communication apparatus that serves as a master station constructs a wireless network and provides parameters for connecting to the wireless network. Note that a master station (for example, a wireless LAN access point) determines a channel and performs communication with a wireless LAN station (to be also referred to as a slave station) by using the determined channel.

System Arrangement

FIG. 1 is a block diagram showing an example of the arrangement of a communication system 100 (to be also referred to as a processing system 100 hereinafter) according to an embodiment of the present invention. The communication system 100 includes a cloud server 200, an edge server 300, and devices 400 which are connected by a local area network 102 and an Internet 104. The devices 400 include various kinds of apparatuses that can connect to a network. The various kinds of apparatuses can be, for example, a smartphone 500, a printer 600, a client terminal 401 such as a personal computer, a work station, or the like, a digital camera 402, and the like. However, the devices 400 are not limited to these kinds of apparatuses and may include, for example, household electronic appliances such as a refrigerator, a television, an air conditioner, and the like. These devices 400 are connected to each other via the local area network 102 and can connect to the Internet 104 via a router 103 arranged in the local area network 102.

Although the router 103 is illustrated here as a device that connects the local area network 102 and the Internet 104, assume that the local area network 102 is a wireless local area network in this embodiment. Assume also that the router 103 has a wireless LAN access point function for forming this network. That is, the router 103 operates as abase station that constructs a wireless network. In this case, it can be arranged so that each of the devices 400 will be able to participate in the wireless network constructed by the base station, in addition to connecting to a wired LAN via the router 103. For example, it may be arranged so that the printer 600 and the client terminal 401 are connected by the wired LAN, and the smartphone 500 and the digital camera 402 are connected by the wireless LAN. Note that a device connected to the wireless LAN may also be referred as a wireless LAN device, a wireless network device, or the like regardless of the type of the device in this embodiment. A communication method in compliance with, for example, the IEEE802.11 series (IEEE802.11a, IEEE802.11n (Wi-Fi 4), IEEE802.11ac (Wi-Fi 5), IEEE802.11ax (Wi-Fi 6), and the like) can be used as the wireless communication method.

Each of the devices 400 and the edge server 300 can communicate with the cloud server 200 through the Internet 104 which is connected via the router 103. The edge server 300 and each of the devices 400 can communicate with each other via the local area network 102. Also, the devices 400 can communicate with each other via the local area network 102. The smartphone 500 and the printer 600 can also communicate with each other by short-range wireless communication 101. Wireless communication in compliance with Bluetooth® standards and NFC standards can be used as the short-range wireless communication 101. The smartphone 500 is also connected to a cellular network 105 and can communicate with the cloud server 200 by connecting to the Internet 104 through this cellular network 105. Note that this arrangement is merely an example of the present invention, and the effects of this embodiment do not change even if a different arrangement is taken. For example, although an example in which the router 103 has a wireless LAN access point function has been shown, the wireless LAN access point may be formed by an apparatus which is different from the router 103. Also, a connection method other than the local area network 102 may be used as the connection between the edge server 300 and each of the devices 400. For example, wireless communication other than the wireless LAN such as LPWA (Low Power Wide Area), ZigBee®, Bluetooth®, short-range wireless communication, or the like, wired communication such as a USB or the like, infrared communication, or the like may be used.

Apparatus Arrangement

FIG. 2 is a block diagram showing an example of the arrangement of the cloud server 200 and the edge server 300. Assume that a common hardware arrangement will be used as the hardware arrangements of the cloud server 200 and the edge server 300 in this description. Each of the servers 200 and 300 includes a mainboard 210 that controls the overall apparatus, a network connection unit 201, and a hard disk unit 202. A CPU (Central Processing Unit) 211 in the form of a microprocessor is arranged in the mainboard 210, and operates in accordance with a control program stored in a program memory 213 and the contents of a data memory 214 which are connected via an internal bus 212. The CPU 211 communicates with another apparatus by connecting to a network such as the Internet 104, the local area network 102, or the like by controlling the network connection unit 201 via a network control circuit 215. The CPU 211 can read data from and write data to the hard disk unit 202 which is connected via a hard disk control circuit 216. Other than storing control software of the cloud servers 200 and 300 and an operating system which is loaded and used in the program memory 213, the hard disk unit 202 also stores various kinds of data. A GPU (general-purpose processing unit) 217 is connected to the mainboard 210 and can execute various kinds of computational processing instead of the CPU 211. Since the GPU 217 can perform efficient computation by performing parallel processing on a greater amount of data, it is effective to perform processing by the GPU 217 in a case in which training is to be performed over a plurality of times by using a training model such as deep learning. Hence, in this embodiment, assume that the GPU 217 will be used in addition to the CPU 211 to execute processing by a training module 251 (to be described later). More specifically, in a case in which a training program including a training model is to be executed, the training will be executed by causing the CPU 211 and the GPU 217 to perform computation cooperatively. Note that the processing of the training module 251 may be performed by only the CPU 211 or the GPU 217. In addition, an estimation module 351 may also use the GPU 217 in a similar manner to the training module 251. Furthermore, although it has been described that the cloud server 200 and the edge server 300 use a common arrangement in this embodiment, the application of the present invention need not be limited to this arrangement. For example, it may be arranged so that the GPU 217 will be included in the cloud server 200 but not included in the edge server 300 or it may be arranged so that the GPU 217 which has a difference capability will be used.

Figure 3:
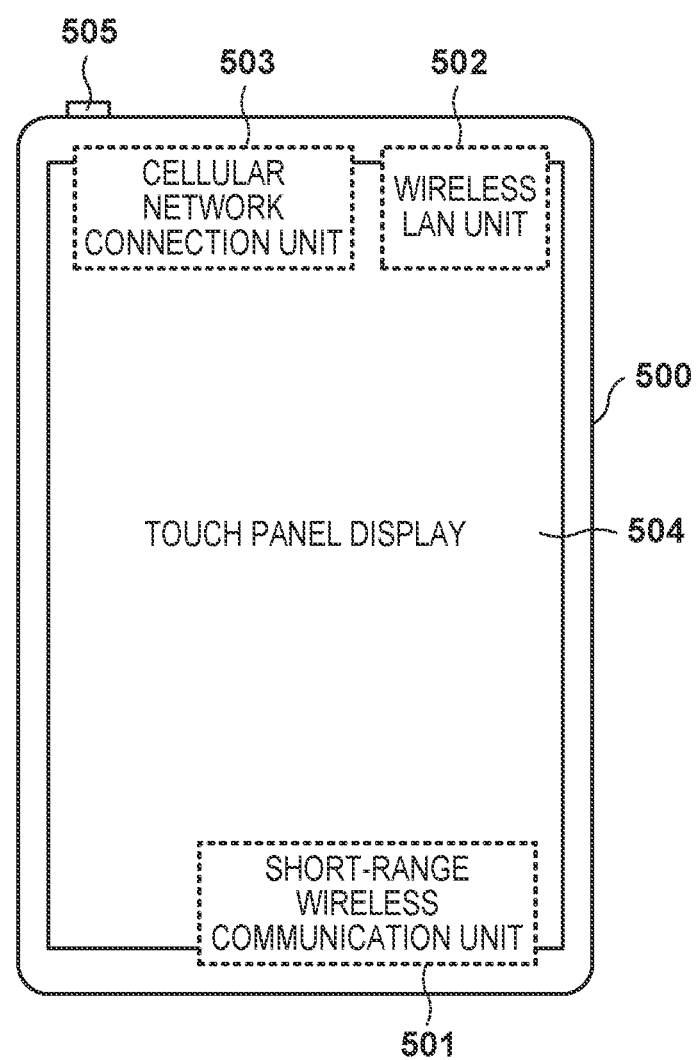
FIG. 3 is an external view of a smartphone 500.

FIG. 3 is an external view of the smartphone 500. A smartphone is a multifunctional mobile phone which has, other than a mobile phone function, a camera, a web browser, an emailing function, and the like. A short-range wireless communication unit 501 is a unit that performs short-range wireless communication and can communicate with the short-range wireless communication unit of a communication partner which is present within a predetermined distance. A wireless LAN unit 502 is arranged in the apparatus and is a unit that uses the wireless LAN to connect to the local area network 102 to perform communication. A cellular network connection unit 503 is arranged in the apparatus and is a unit that connects to the cellular network to perform communication. A touch panel display 504 is arranged on the front surface of the smartphone 500 and includes both an LCD display mechanism and a touch-panel operation mechanism. A representative operation method is a method in which button-shaped operation parts are displayed on the touch panel display 504 and an event is issued when a button is pressed by a user performing a touch operation on the touch panel display 504. A power button 505 is used to turn on and off the power supply of the smartphone. Note that the arrangement of FIG. 3 is merely an example, and the smartphone 500 may include feature parts other than these and may not include some of these components. However, assume that the wireless LAN unit 502 is included in this embodiment.

Figure 4A:
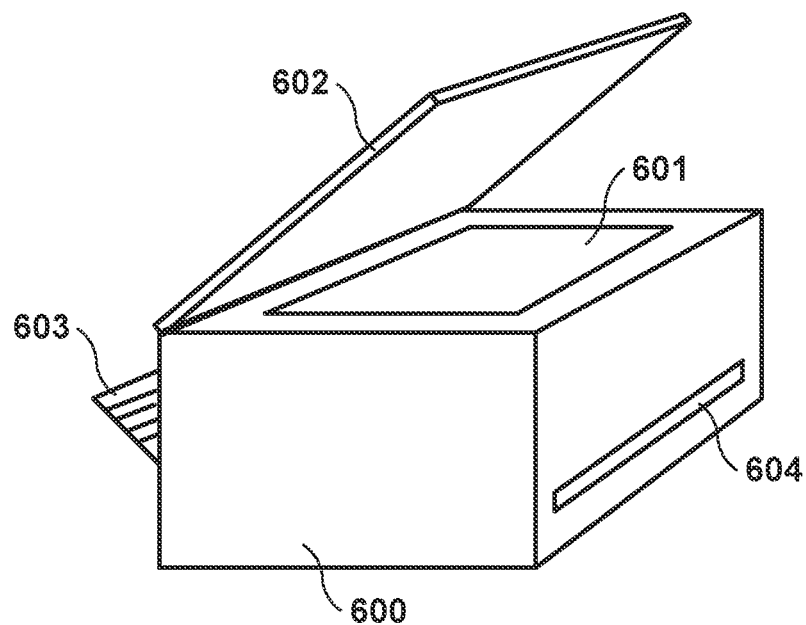
FIGS. 4A and 4B are external views of a printer 600.
Figure 4B:
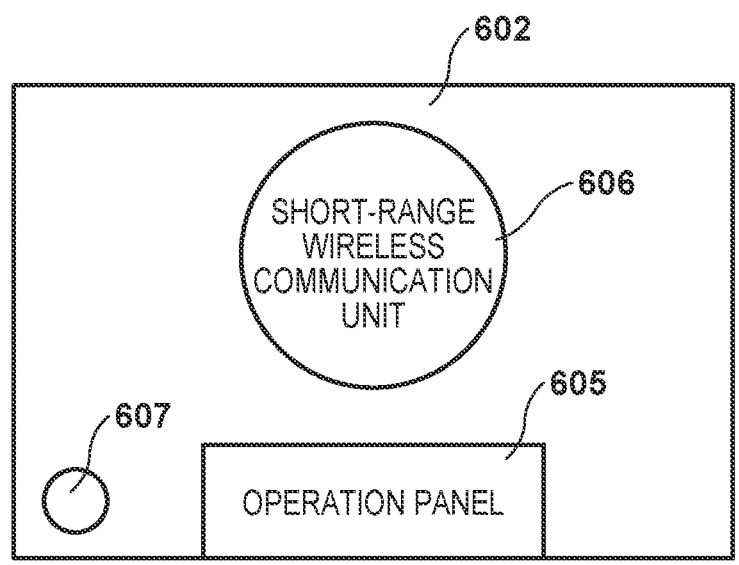

FIGS. 4A and 4B are external views of the printer 600. A multifunction printer (MFP) which is a printer including other functions such as a scanner and the like is used as an example in this embodiment. FIG. 4A shows the overall external view of the printer 600. A document table 601 is a clear table made of a glass-like material and is used as a table on which an original is placed when the original is to be read by a scanner. A document table platen 602 is a cover for pressing the original onto the document table to prevent the document from floating and prevent external light from entering into the scanner unit when the document is to be read by the scanner. A print sheet feeding port 603 is a feeding port for setting various sizes of sheets. Each sheet which has been set on this feeding port is conveyed sheet by sheet to a printing unit, undergoes a desired printing operation, and is discharged from a print sheet discharge port 604. FIG. 4B shows an external view of the upper surface of the printer 600. An operation panel 605 and a short-range wireless communication unit 606 are arranged on the upper portion of the document table platen 602. The short-range wireless communication unit 606 is a unit for performing short-range wireless communication and can communicate with the short-range wireless communication unit of a communication partner which is present within a predetermined distance. A wireless LAN unit 607 is embedded with an antenna that performs communication by connecting to the local area network 102 via the wireless LAN.

Figure 5:
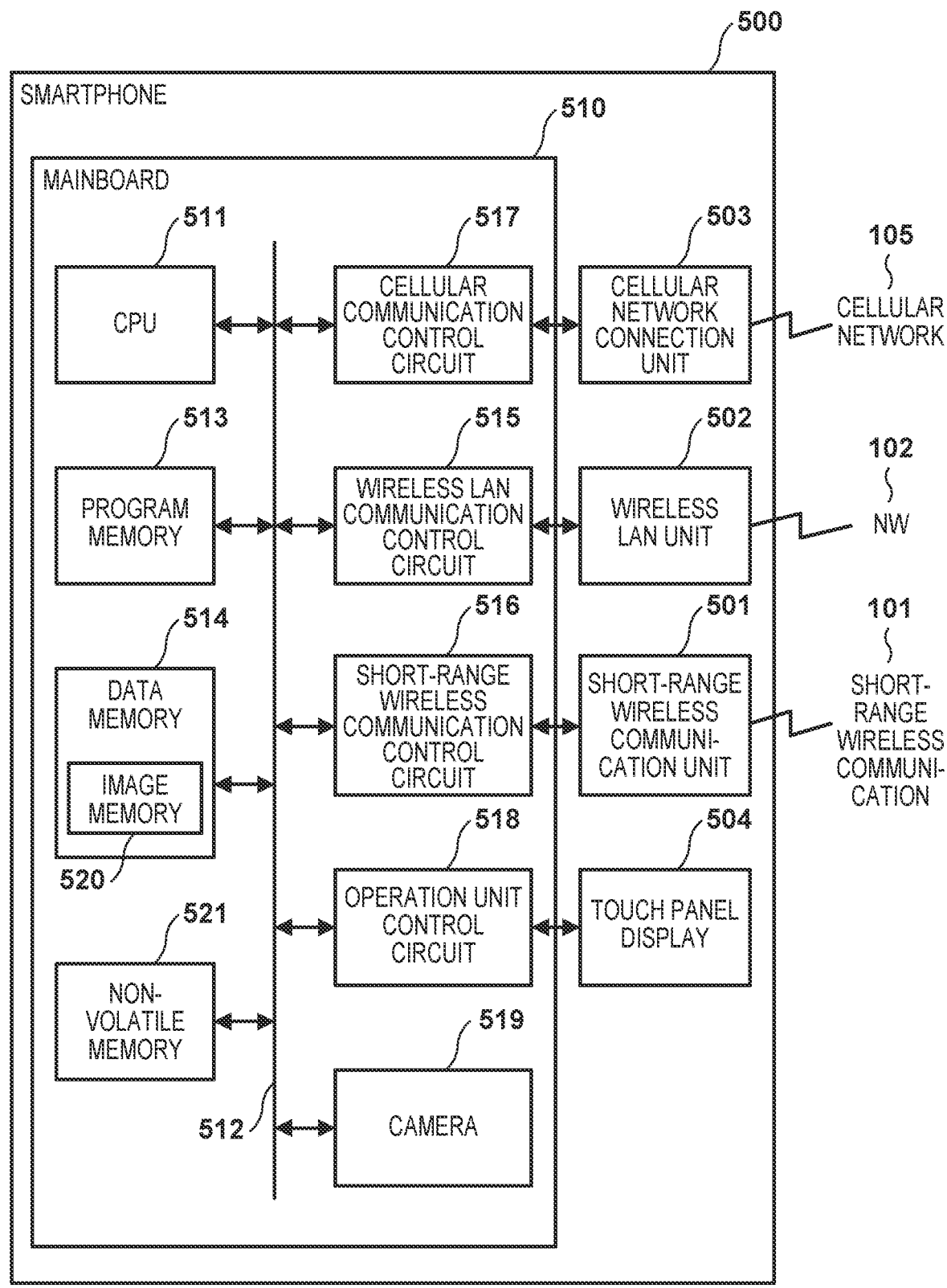
FIG. 5 is a block diagram showing the arrangement of the smartphone 500.

FIG. 5 is a block diagram showing an example of the arrangement of the smartphone 500. The smartphone 500 includes a mainboard 510, the wireless LAN unit 502, the short-range wireless communication unit 501, and the cellular network connection unit 503. A CPU 511 in the form of a microprocessor is arranged in the mainboard 510, and operates in accordance with a control program stored in a program memory 513 in the form of a ROM and the contents of a data memory 514 in the form of a RAM which are connected via an internal bus 512. The CPU 511 performs wireless LAN communication with another communication terminal apparatus by controlling the wireless LAN unit 502 via a wireless LAN control circuit 515. The CPU 511 can control the short-range wireless communication unit 501 via a short-range wireless communication control circuit 516 to detect connection with another short-range wireless communication terminal and to exchange data with the other short-range wireless communication terminal. Also, the CPU 511 controls the cellular network connection unit 503 via a cellular communication control circuit 517 to connect to the cellular network 105 and to perform telephone communication and data exchange. The CPU 511 can control an operation unit control circuit 518 to make desired display on the touch panel display 504 and to receive an operation from the user. The CPU 511 can control a camera unit 519 to capture an image and store the captured image in an image memory 520 of the data memory 514. In addition to captured images, it is also possible to store images obtained from the outside via the cellular network, the local area network 102, and the short-range wireless communication 101 in the image memory 520. On the other hand, it is also possible to transmit the captured images to the outside.

A non-volatile memory 521 is formed by a flash memory or the like and stores data that needs to be stored even after the power has been turned off. For example, in addition to address book data, various kinds of communication connection information, information of devices to which the smartphone has connected with in the past, and the like, image data desired to be stored, application software for implementing various kinds of functions in the smartphone 500 or the like may also be stored.

Figure 6:
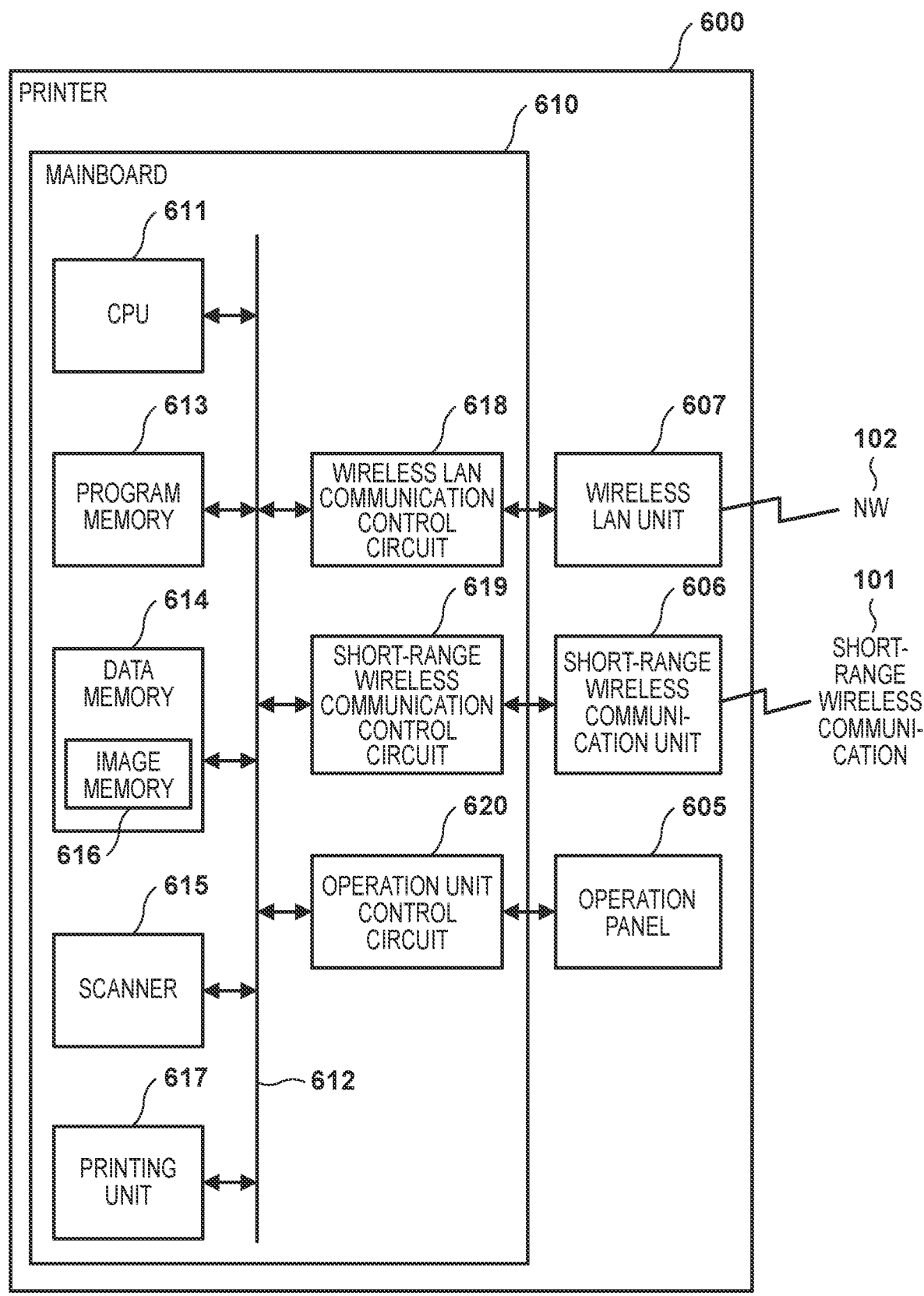
FIG. 6 is a block diagram showing the arrangement of the printer 600.

FIG. 6 is a block diagram showing an example of the arrangement of the printer 600. The printer 600 includes a mainboard 610 that controls the entire apparatus, the wireless LAN unit 607, and the short-range wireless communication unit 606. A CPU 611 in the form of a microprocessor is arranged in the mainboard 610, and operates in accordance with a control program stored in a program memory 613 in the form of a ROM and the contents of a data memory 614 in the form of a RAM which are connected via an internal bus 612. The CPU 611 controls a scanner unit 615 to read an original and to store the data in an image memory 616 of the data memory 614. The CPU 611 can also control a printing unit 617 to print an image in the image memory 616 of the data memory 614 on a print medium. The CPU 611 performs wireless LAN communication with another communication terminal apparatus by controlling the wireless LAN unit 607 via a wireless LAN control circuit 618. The CPU 611 can control the short-range wireless communication unit 606 via a short-range wireless communication control circuit 619 to detect a connection with another short-range wireless communication terminal and to exchange data with the other short-range wireless communication terminal. The CPU 611 can control an operation unit control circuit 620 to display the state of the printer 600, display a function selection menu, and accept an operation from the user on the operation panel 605. The operation panel 605 includes a backlight, and the CPU 611 can perform control to turn on or off the backlight via the operation unit control circuit 620. Although it will be difficult to see the display on the operation panel 605 when the backlight is turned off, it will be possible to suppress the power consumption of the printer 600.

Figure 7:
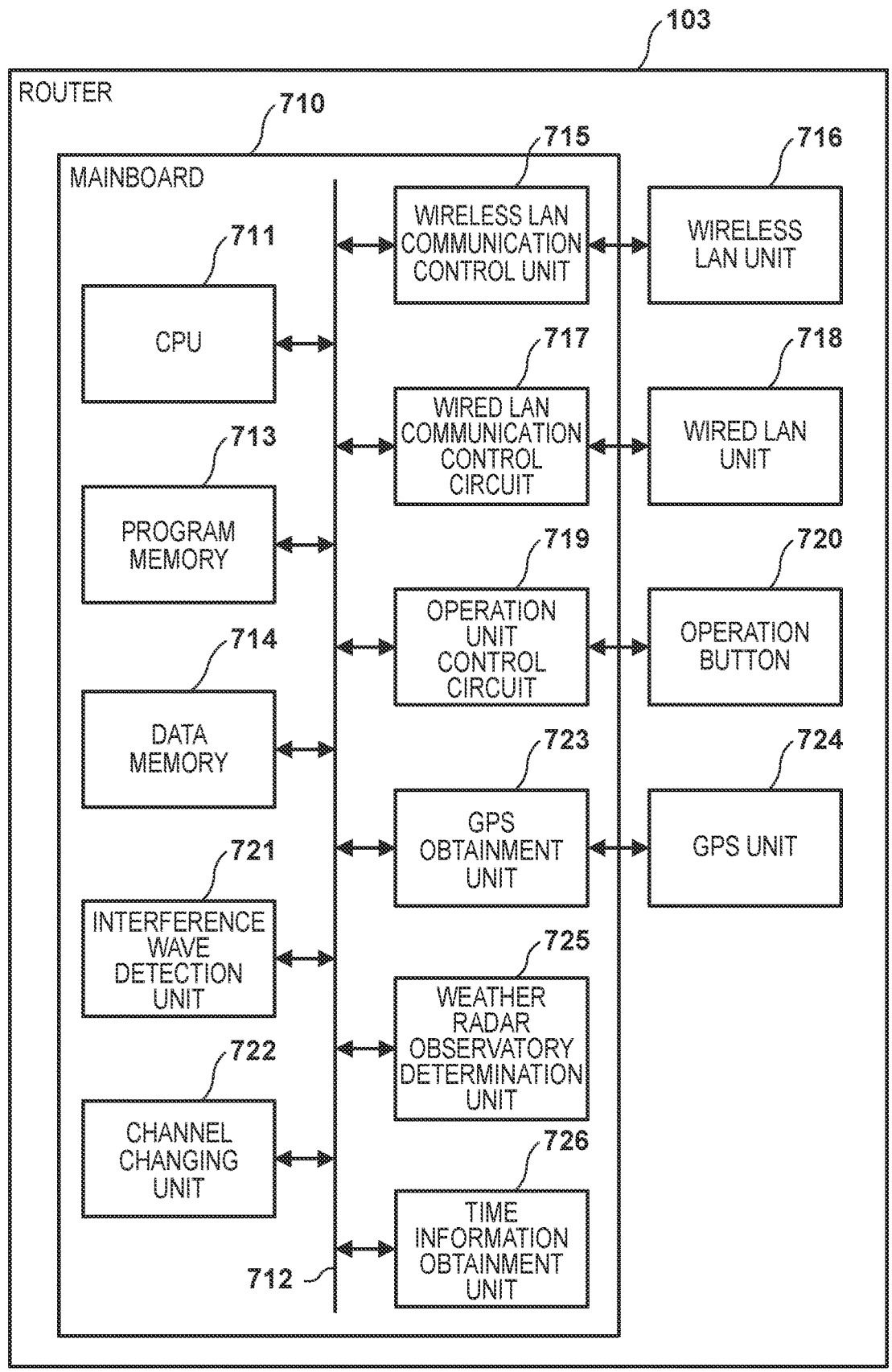
FIG. 7 is a block diagram showing the arrangement of a router 103.

FIG. 7 is a block diagram showing an example of the arrangement of the router 103 that has a wireless LAN access point function. A mainboard 710 that controls the router 103, a wireless LAN unit 716, a wired LAN unit 718, and an operation button 720 are included in the router. A CPU 711 in the form of a microprocessor is arranged in the mainboard 710, and operates in accordance with a control program stored in a program memory 713 in the form of a ROM and the contents of a data memory 714 in the form of a RAM which are connected via an internal bus 712. The CPU 711 performs wireless LAN communication with another communication terminal apparatus by controlling the wireless LAN unit 716 via a wireless LAN communication control unit 715. The CPU 711 also performs wired LAN communication with the other communication terminal apparatus by controlling the wired LAN unit 718 via a wired LAN communication control unit 717. The CPU 711 can control an operation unit control circuit 719 to accept an operation on the operation button 720 from the user.

A router 103 includes an interference wave detection unit 721, a channel changing unit 722, a GPS obtainment unit 723, a GPS unit 724, a weather radar observatory determination unit 725, and a time information obtainment unit 726.

The interference wave detection unit 721 performs interference wave detection processing when wireless communication is being executed in a band in which DFS (Dynamic Frequency Selection) is being performed.

The channel changing unit 722 performs channel processing to change the channel to be used if an interference wave is detected and the channel which is being used needs to be immediately changed to a free channel or the like when wireless communication is being executed in a band in which DFS is being performed.

The GPS obtainment unit 723 obtains, from the GPS unit 724, GPS information, such as longitude, latitude, and altitude indicating a position where the router 103 is installed.

The weather radar observatory determination unit 725 determines, based on the target weather radar observatory information (the position information of the weather radar observatory) stored in the cloud server 200 or the like and the GPS information of the router 103 obtained by the GPS obtainment unit 723, the weather radar observatory that has the most influence on the router 103. Pieces of position information of a plurality of weather radar observatories are included in the weather radar observatory information obtained from the cloud server 200, and the weather radar observatory determination unit 725 determines that, for example, the weather radar observatory which is located closest to the installation position of the router 103 as the weather radar observatory that has the most influence on the router 103.

The time information obtainment unit 726 obtains information indicating the time by wireless LAN communication or wired LAN communication. Note that the weather radar observatory is an interference wave source according to this embodiment. In a case in which there is another interference wave source, information indicating this position can be used as the weather radar observatory information.

P1 Software Arrangement of Processing System

Figure 8:
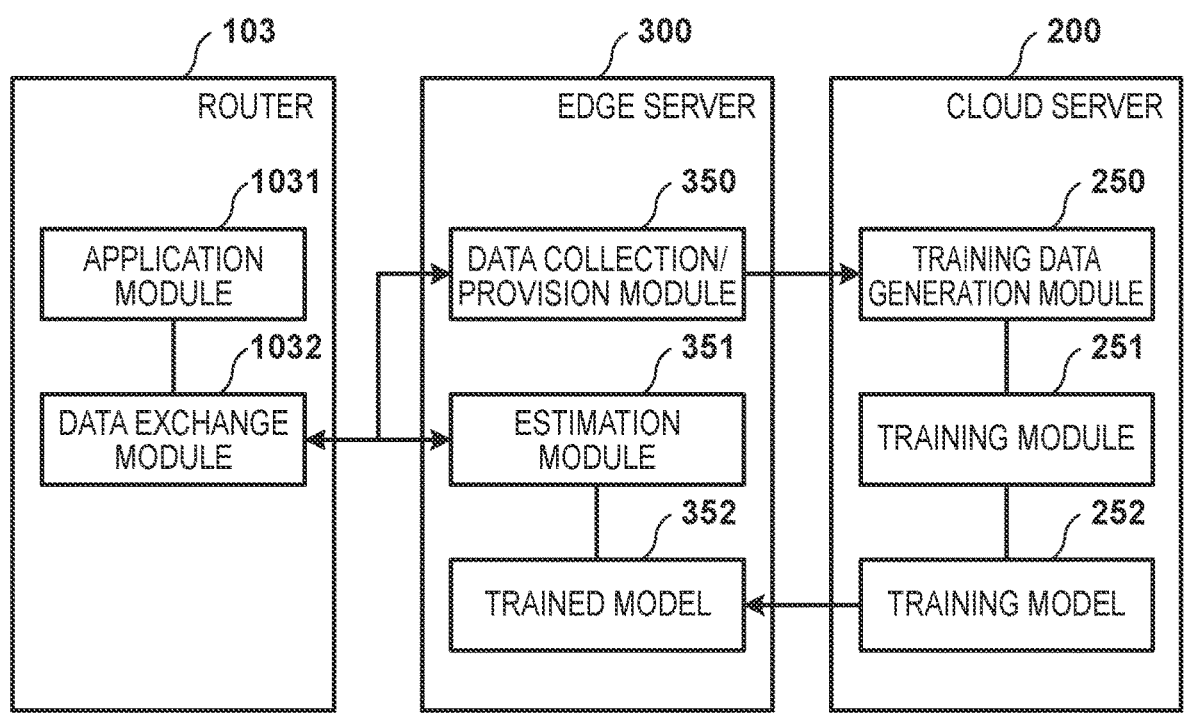
FIG. 8 is a view showing the software arrangement of a processing system 100.

FIG. 8 is a block diagram showing the software arrangement of the processing system 100. In this embodiment, the occurrence of interference waves with respect to the wireless LAN is predicted based on machine learning, and a channel that will not interfere will be selected. Hence, only the modules related to training and estimation processing of the software modules according to this embodiment are illustrated in FIG. 8, and other software modules are not illustrated. For example, illustration of operating systems and various kinds of middleware operating on the server and the devices, an application for maintenance, and the like has been omitted.

The cloud server 200 generates training data based on the collected data and executes processing for generating a training model. That is, the cloud server has a learning function. Hence, the cloud server 200 includes a training data generation module 250, the training module 251, and a training model 252. The training data generation module 250 is a module that generates, from data received from the outside, training data that can be processed by the training module 251. Training data is a set of input data X of the training module 251 and supervised data T indicating the correct answer of the training result. The training module 251 is a program module for executing training of the training data received from the training data generation module 250 with respect to the training model 252. The training model 252 accumulates the results of training by the training module 251. An example in which the training model 252 is implemented as a neural network will be described here. By optimizing the weight parameter between the nodes of the neural network, the input data can be classified or an evaluation value can be determined. In a case in which a neural network is used, it can be said that training is a process for determining the weight parameter between nodes. An output from a node of an output layer of the neural network becomes the output of the trained model. The accumulated training model 252 is distributed to the edge server 300 as a trained model and is used for estimation processing in the edge server 300.

The edge server 300 collects data to be used in the generation of training data, provides the collected data to the cloud server 200, and executes estimation processing using the data collected from the router 103 and the training model 252 provided from the cloud server 200. Hence, the edge server 300 includes a data collection/provision module 350, the estimation module 351, and a trained model 352. The data collection/provision module 350 is a module that transmits, to the cloud server 200, the data received from the router 103 and data collected by the edge server 300 itself as data sets to be used for training. The estimation module 351 is a program module that executes estimation using the trained model 352 based on the data transmitted from the router 103 and returns the result of the estimation to the router 103. The data transmitted from the devices 400 are data to be the input data X of the estimation module 351. The trained model 352 is used for the estimation performed by the edge server 300. Assume that the trained model 352 is implemented as a neural network in a manner similar to the training model 252. However, as will be described later, the trained model 352 may be the same as the training model 252 or may extract and use a part of the training model 252. The trained model 352 stores the training model 252 accumulated by and distributed from the cloud server 200. The trained model 352 may distribute the entire training model 252 or may extract a part necessary for the estimation by the edge server 300 from the training model 252 and distribute the extracted part.

The router 103 functions as a device that provides the input data and the supervised data in the training and estimation process shown in FIG. 8. The router 103 includes an application module 1031 and a data exchange module 1032. The application module 1031 is a module that implements various kinds of functions to be executed by the router 103 and is a module that uses a training/estimation mechanism by machine learning. The data exchange module 1032 is a module for requesting the edge server 300 to perform training or an estimation. During training, data to be used for training is transmitted to the data collection/provision module 350 of the edge server 300 by a request from the application module 1031. Also, during an estimation, data to be used in the estimation is transmitted to the edge server 300 based on a request from the edge server 300, and the received result is returned to the application module 1031.

Note that although this embodiment shows a mode in which the training model 252 trained by the cloud server 200 is distributed and used for estimation as the trained model 352 to the edge server 300, the present invention is not limited to this mode. Which of the cloud server 200, the edge server 300, and the router 103 is to execute each of the training and the estimation can be determined in accordance with the distribution of hardware resources, the calculation amount, and the volume of the data communication amount. Furthermore, the training and the estimation can also be executed by other wireless network devices 400. Alternatively, it may be arranged so that the training and the estimation mode will change in accordance with the distribution of the resources, the calculation amount, and the increase/decrease in the data communication amount. In a case in which training and estimation are to be performed by different subjects, it may be arranged so that the estimation side can reduce a logic used only in the estimation and the capacity of the trained model 352 or execute the estimation at a higher speed.

Training Model

Figure 9A:
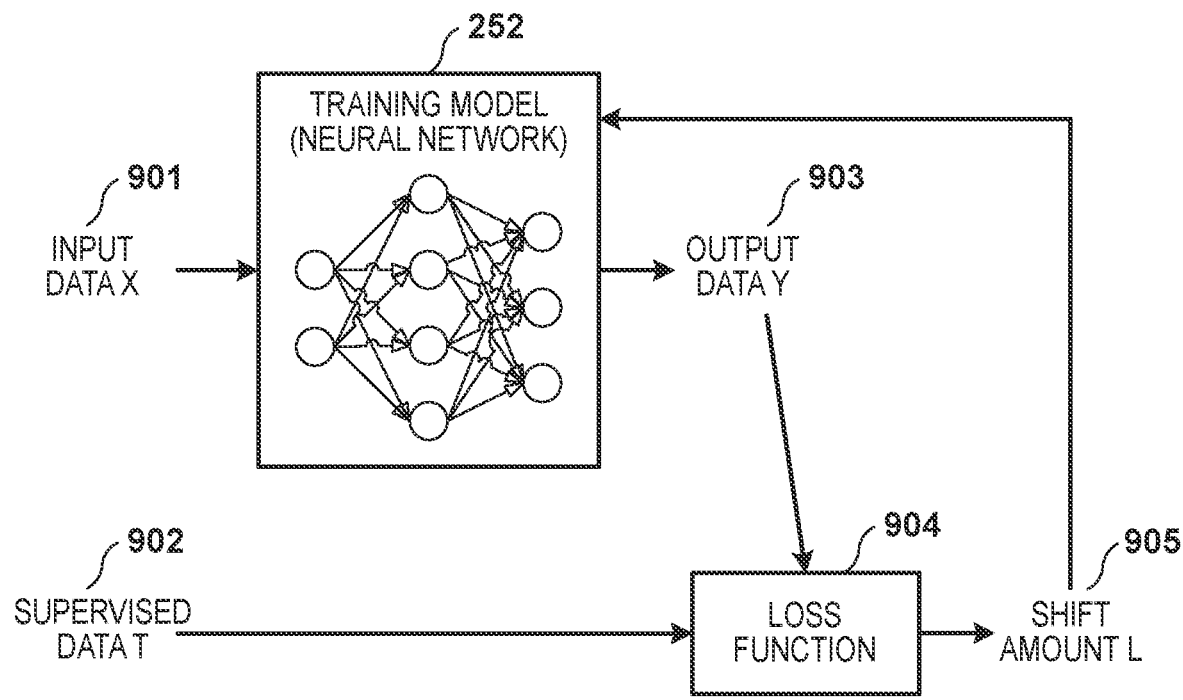
FIG. 9A is a conceptual view showing the structure of inputs and outputs when a training model 252 is used.
Figure 9B:
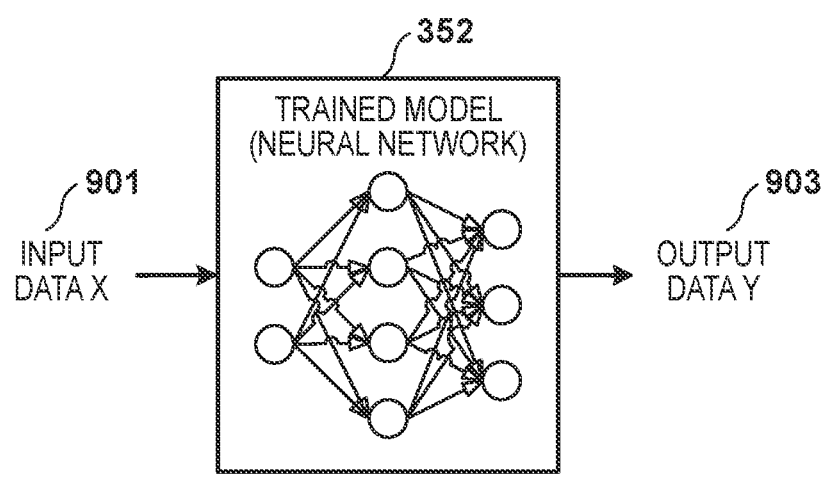
FIG. 9B is a conceptual view showing the structure of inputs and outputs when a trained model 352 is used.

FIGS. 9A and 9B are conceptual views showing the structure of inputs and outputs when using the training model 252 and the trained model 352, respectively. FIG. 9A shows the relationship between the training model 252 and the input/output data during training. Input data X 901 is data of the input layer of the training model 252. The input data X 901 according to this embodiment will be described in detail later. Output data Y 903 is output as a result of verifying the input data X 901 by using the training model 252 as a machine learning model. During training, since supervised data T 902 is provided as correct answer data of the verification result of the input data X 901, a shift amount L 905 from the correct answer of the verification result is obtained by providing loss function 904 to the output data Y 903 and the supervised data T 902. The input data X 901 may be referred to as training data. The supervised data T 902 may be referred to as evaluation data. The supervised data T 902 is information indicating the channel in which interference has actually been generated at the position and the time corresponding to the provided input data X 901. Connection weight coefficients and the like between the nodes of the neural network in the training model 252 are updated so as to reduce the shift amount L with respect to large amounts of training data. For example, backpropagation can be used as an algorithm in machine learning. Backpropagation is a method in which connection weight coefficients and the like between the nodes of each neural network are adjusted so as to minimize the above-described error. The nearest neighbor method, the naive Bayes method, the decision tree method, support vector machine, and the like are more specific examples of other algorithms which can be used in machine learning. Also, deep learning in which the feature amounts and the connection weight coefficients for training are self-generated by using a neural network may also be used as an algorithm in machine learning. An algorithm that can be suitably used among the above-described algorithms can be used in this embodiment.

FIG. 9B shows the relationship between the trained model 352 and the input/output data during estimation. The input data X 901 is the data of the input layer of the trained model 352. The input data X 901 according to this embodiment will be described in detail later. The output data Y 903 is output as a result of validating the input data X 901 by using the trained model 352 as a machine learning model. This output data Y is used as the estimation result during the estimation. Note that although it has been described that the trained model 352 used during estimation includes the same neural network as that of the training model 252 used during training, a model obtained by extracting only the parts necessary for the estimation can also be prepared as the trained model 352. As a result, it will be possible to reduce the data amount of the trained model 352 and to reduce the neural network processing time during the estimation. The processing according to this embodiment will be described hereinafter based on the arrangement described above.

Processing Contents

A method of determining a channel to be used in wireless communication by using machine learning to estimate the information of a channel in which an interference wave will be generated in the processing system according to the above-described embodiment will be described.

The router 103 has a wireless LAN access point function that forms the local area network 102, and each of the devices 400 connects to the router 103. That is, each of the devices 400 participates in the wireless network constructed by the router 103. In this case, the router 103 activates the wireless LAN access point by designating a channel to be used in wireless communication.

Note that the router 103 according to this embodiment can use both the 2.4 GHz band and the 5 GHz band. W52 (5.2 GHz band (5150 to 5250 MHz)), W53 (5.3 GHz band (5250 to 5350 MHz)), W56 (5.6 GHz band (5470 to 5725 MHz)), W58, and the like are present as bands used in the 5 GHz band, and usable bands are regulated in accordance with the law of the country or the region. Among these, W53 and W56 are the bands (DFS bands) in which DFS is executed. For example, channels 52, 56, 60, and 64 are used in W53. Channels 100, 104, 108, 112, 116, 120, 124, 128, 132, 136, and 140 are used in W56. For example, W52, W53, and W56 are set as the usable bands in the 5 GHz band in Japan. W52 is the only band (non-DFS band) that does not receive the interference wave due to DFS. For example, W52 uses channels 36, 40, 44, and 48.

In a case in which the channel to which the router 103 and the devices 400 have been connected via the wireless LAN is a DFS band of the 5 GHz band and if radio interference is detected from the monitoring of interference waves, the connection channel must be immediately changed to another free channel. However, since it is problematically impossible to predict when the radio interference will be generated, the communication speed will degrade and the communication will need to be disconnected even if communication is being executed when an interference wave is detected.

In this embodiment, the edge server 300 will estimate the information of a channel in which an interference wave is generated by using a trained model generated by the cloud server 200. The router 103 with the wireless LAN access point will subsequently determine the channel or perform change processing based on the estimation result. The training model will be updated by machine learning if an interference wave is detected in the determined channel. However, although it will be described that the arrangement of a case in which the router 103 has a wireless LAN access point function will be used in this embodiment, the present invention need not be limited to this arrangement. Note that the wireless LAN access point function may be provided in an apparatus which is different from the router 103. In such a case, the information related to the channel that has been determined will be transmitted to the apparatus which has the wireless LAN access point function. In addition, although an edge server estimates the channel with the interference in this embodiment, this estimation may also be performed by the apparatus that has the wireless LAN access point function. A router with a wireless LAN access point may be referred to as a wireless LAN router hereinafter. The control operation for determining a channel to be used in wireless communication by using machine learning to estimate the information of a channel in which an interference wave will be generated will be performed in the following cases of 1 to 3.

1. During setup at powering-on
2. During channel change by manual setting
3. During channel change by interference wave detection Channel change switching control will be described in detail hereinafter.

Training of Estimation of Channel in which Interference Will be Generated

The influence of an interference wave from the weather radar or the like depends on the distance and altitude from a weather radar observatory. For example, an influence may not be received in a case in which the distance from the weather radar observatory is short but an altitude difference is present due to the characteristic of the weather radar. Hence, it will be possible to estimate the information of a channel in which interference will be generated by executing training by using the position information of the wireless LAN router 103 including the altitude obtained from the GPS information, the position information of the weather radar observatory considered to have the most influence on the router, the time of the occurrence of the radio interference due to the weather radar, and the information of the channel that was being used at the time of the generation of the interference.

Figure 10:
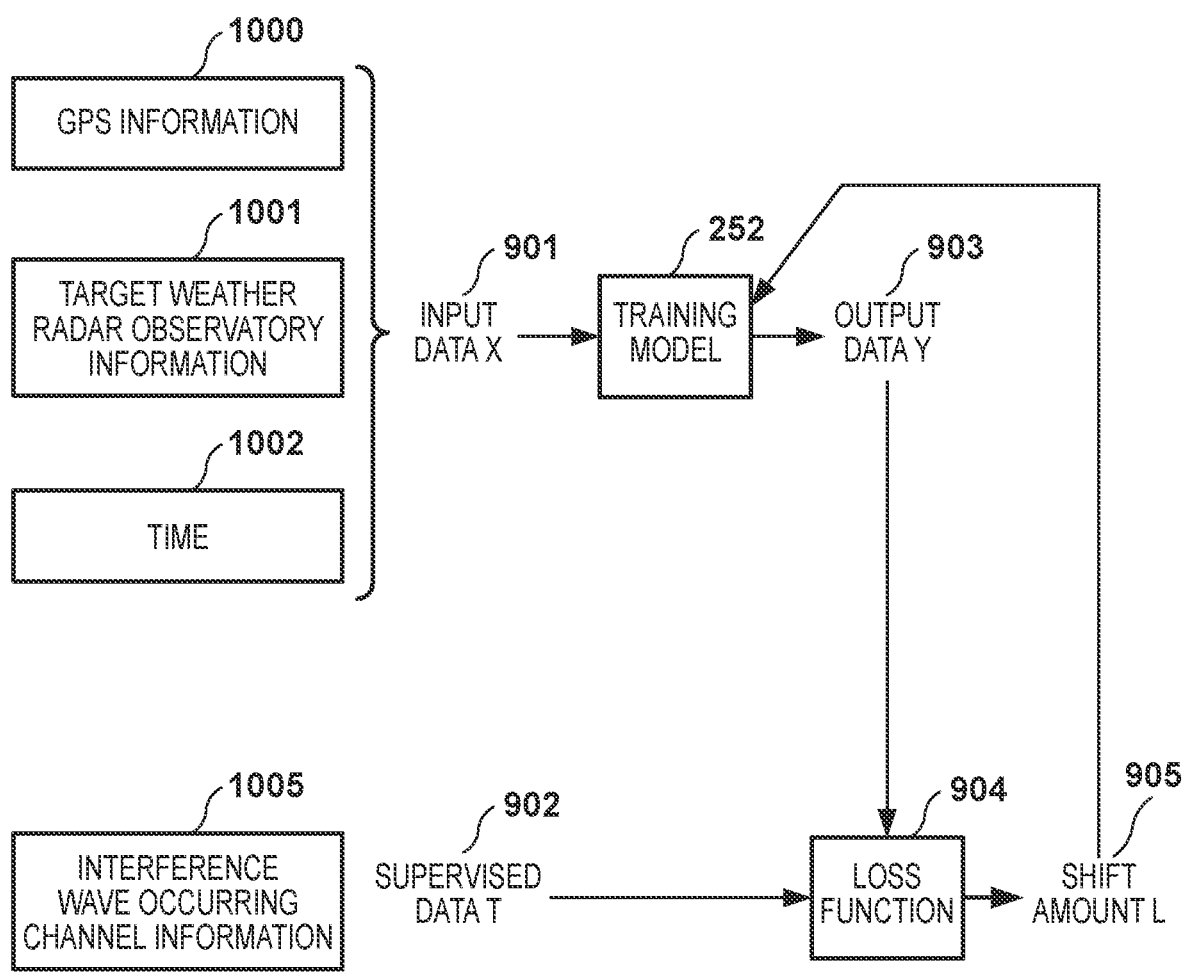
FIG. 10 is a view showing the structure of the inputs and outputs of the training model 252 during training.

FIG. 10 is a view showing the structure of inputs and outputs of the training model 252 during training. As shown in FIG. 10, GPS information 1000, target weather radar observatory information 1001, and data of time 1002, which are the causes of change in the information of the channel in which the interference will be generated, are used as the input data X 901. The GPS information 1000 indicates the current position of the wireless LAN router 103. The target weather radar observatory information 1001 indicates the weather radar observatory (for example, the position of the weather radar observatory closest to the wireless LAN router 103) which is considered to have the most influence on the wireless LAN router 103. The time 1002 indicates the current time and typically indicates the current time at the point in which occurrence of interference has been determined. These data are obtained by the GPS obtainment unit 723, the weather radar observatory determination unit 725, and the time information obtainment unit 726, respectively, of the wireless LAN router 103 and are transmitted as the input data to the cloud server 200 via the edge server 300.

In addition, interference wave occurring channel information 1005 is used as the supervised data T 902. The interference wave occurring channel information 1005 is, for example, information, such as a channel number or the like, indicating the channel in which the interference occurred at the time 1002. For example, it is preferable to use a channel number that has been determined in association with a frequency as this channel number. The presence/absence of an actual interference in the current setting channel can be determined by the interference wave detection unit 721 of wireless LAN router 103. Hence, in regard to the supervised data T 902, if the interference is detected in the current setting channel, the data indicating this channel will be the supervised data T 902. Therefore, the supervised data T 902 is also transmitted from the router 103 to the cloud server 200 via the edge server 300. In this manner, to perform training about the channel (the interfered channel) that receives interference, the GPS information 1000, the weather radar observatory information 1001, and the time 1002 are input as the input data X 901 and the channel with the interference is input as the supervised data T 902. Subsequently, the information of the channel in which interference will be generated is estimated and classified by using the training model 252, and the training model 252 is updated by executing training in the cloud server 200 so as to minimize the shift amount L with respect to the information, as the supervised data T 902, of the channel in which interference will be generated.

In the above-described example, the GPS information 1000, the weather radar observatory information 1001, the time 1002, and the interference wave occurring channel information 1005 are transmitted from the router 103 to the cloud server 200 via the edge server 300 only in a case with the occurrence of interference. Hence, the cloud server 200 can use all of the obtained training data for training.

However, the embodiment is not limited to this. That is, the router 103 may periodically transmit the GPS information 1000, the weather radar observatory information 1001, the time 1002, and the interference wave occurring channel information 1005. In this case, each piece of information will be transmitted even in a case without the occurrence of interference. The interference wave occurring channel information 1005 that is transmitted in the case without the occurrence of interference is not the channel number of the channel with the generation of interference, but is the channel number used at the time 1002. Thus, in this case, the router 103 will transmit information (interference presence/absence information) indicating whether interference has been generated together with the four pieces of information described above. Subsequently, based on these pieces of information, it may be set so one of the edge server 300 and the cloud server 200 will select, based on the interference presence/absence information, only the information of the case with the occurrence of interference as the training data and not select the information of the case without the occurrence of interference as the training data. In a case in which training data selection is to be performed in the edge server 300, only the selected data is transmitted as the training data to the cloud server 200.

In this embodiment, the channel information shift amount L indicates, for example, the difference between the channel number indicated by the output data Y 903 estimated by using the training model 252 and the channel number indicated by the supervised data T 902. Note that it is preferable to implement the interference channel estimation training by obtaining the input data X 901 and the supervised data T 902 in synchronization with the input data X 901 in various kinds of periods from the many wireless LAN routers 103 installed in various locations or from the mobile wireless LAN router 103 that can be moved to various locations and used.

Generation of Input Data X and Supervised Data T

Figure 11A:
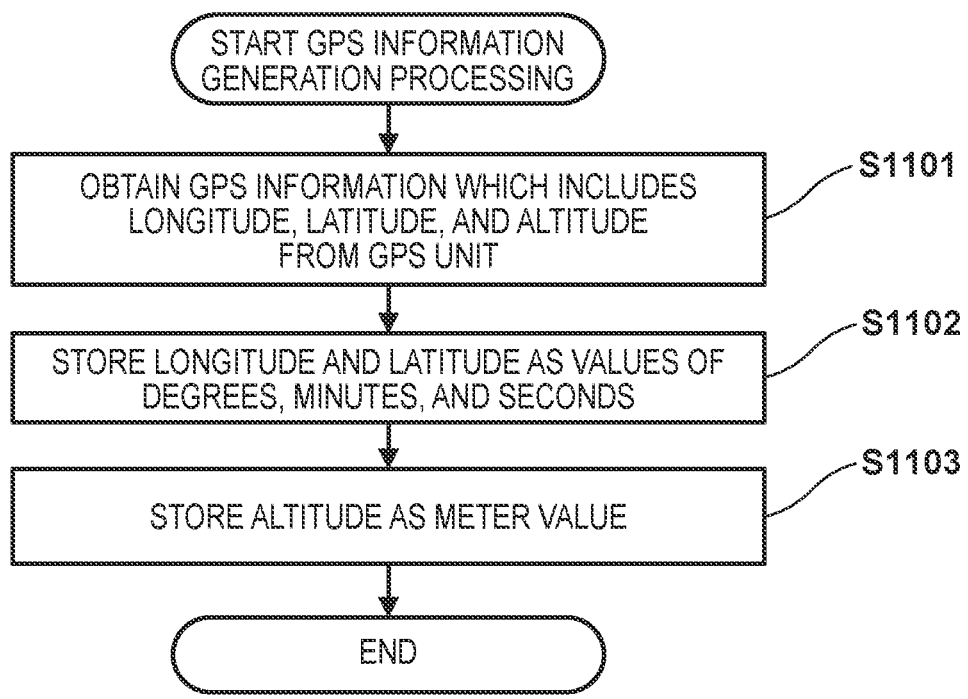
FIGS. 11A and 11B are flowcharts showing input parameter obtainment processing of the training model 252 during training.
Figure 11B:
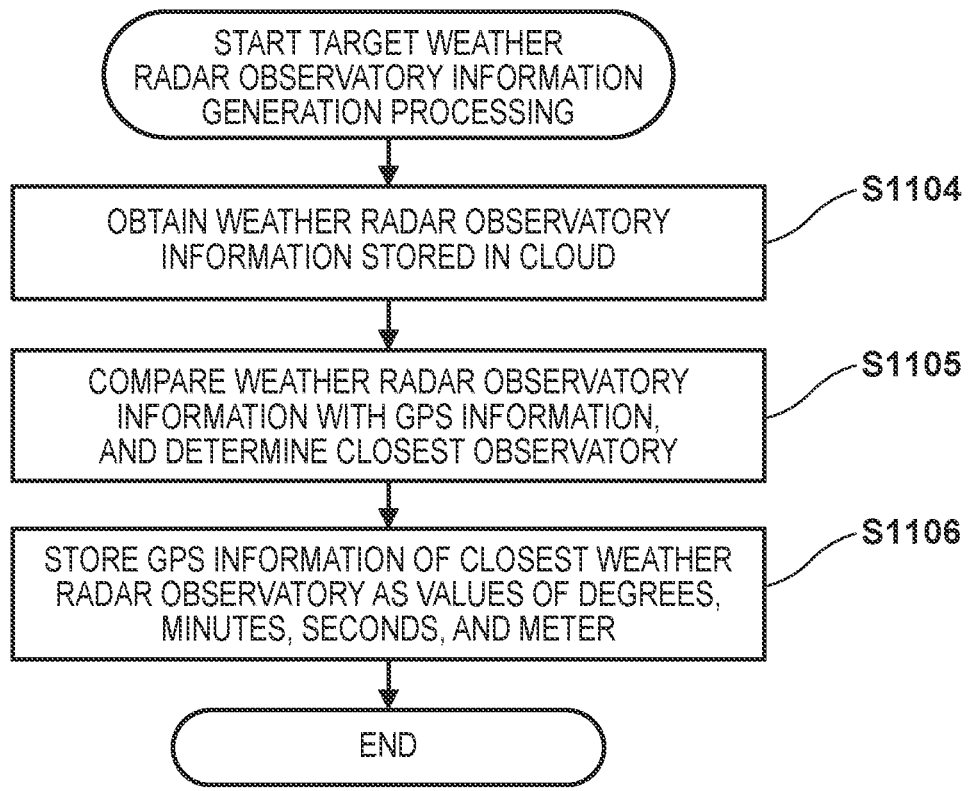

FIGS. 11A and 11B are flowcharts showing the procedures for obtaining the GPS information 1000 and the weather radar observatory information 1001 among the parameters of the input data X 901 for training or estimation. Although the procedures shown by the flowcharts of FIGS. 11A and 11B may be executed by the edge server 300 or the router 103, assume that the router 103 will execute the procedures in this case. The procedures of the flowcharts shown in FIGS. 11A and 11B are implemented by the CPU 711 of the router 103 reading out, to the RAM, a program stored in the program memory 713 or the like, and executing the program. The flowchart for obtaining the GPS information 1000 is shown in FIG. 11A.

In step S1101, the CPU 711 uses the GPS unit 724 to obtain the GPS information which includes the longitude, the latitude, and the altitude showing the installation position of the router 103. Subsequently, the process advances to step S1102. In step S1102, the CPU 711 discriminates the longitude and the latitude that have been obtained in step S1101 into the values of degrees, minutes, and seconds. For example, values 35, 39, and 29 are discriminated in a case in which the longitude and the latitude are 35 degrees, 39 minutes, and 29 seconds, and the values are stored in the data memory 714. Subsequently, the process advances to step S1103. In step S1103, the CPU 711 stores the altitude obtained in step S1101 as a meter value, for example, a value 123 is stored in the data memory 714 in a case in which the altitude is 123 meters. Subsequently, the processing ends.

The flowchart for obtaining the weather radar observatory information 1001 is shown in FIG. 11B. In step S1104, the CPU 711 obtains the weather radar observatory information (including the latitude, the longitude, and the altitude in this example) stored in the cloud server 200, and the process advances to step S1105. In step S1105, the CPU 711 compares the weather radar observatory information obtained in step S1104 with the GPS information 1000, determines the weather radar observatory (for example, the closest weather radar observatory) that has the most influence, and advances the process to step S1106. In step S1106, for example, in a case in which the longitude and the latitude are 35 degrees 51 minutes and 35 seconds, values 35, 51, and 35 are discriminated by the CPU 711 as the values of the degrees, minutes, and seconds of the longitude and the latitude of the GPS information of the closest weather radar observatory determined in step S1105, and the values are stored in the data memory 714. Also, in a case in which the altitude is 74 meters, a value 74 is stored as the value of the meters of the altitude in the data memory 714, and the processing ends.

The CPU 711 obtains the information of the time 1002 from the wireless LAN unit 716 or the wired LAN unit 718. The information of the currently operating channel is obtained from the wireless LAN communication control unit 715 and the interference wave occurring channel information 1005, and the value of the channel is stored in the data memory 714. Interference wave presence/absence information is obtained from the detection result of the interference wave detection unit 721. 1 is stored as value in the data memory 714 if an interference wave has been generated, and 0 is stored as a value in the data memory if an interference wave has not been generated. The above-described data stored in the data memory 714 is transmitted as input data X 911 and the supervised data T to the edge server 300, is further transferred to the cloud server 200, and is used to generate the training model 252. Also, the above-described data stored in the data memory is used for channel estimation using the trained model 352 by the edge server 300. However, the interference wave presence/absence information may not be employed as a part of the input data X 901.

Channel Estimation Using Trained Model

Figure 12:
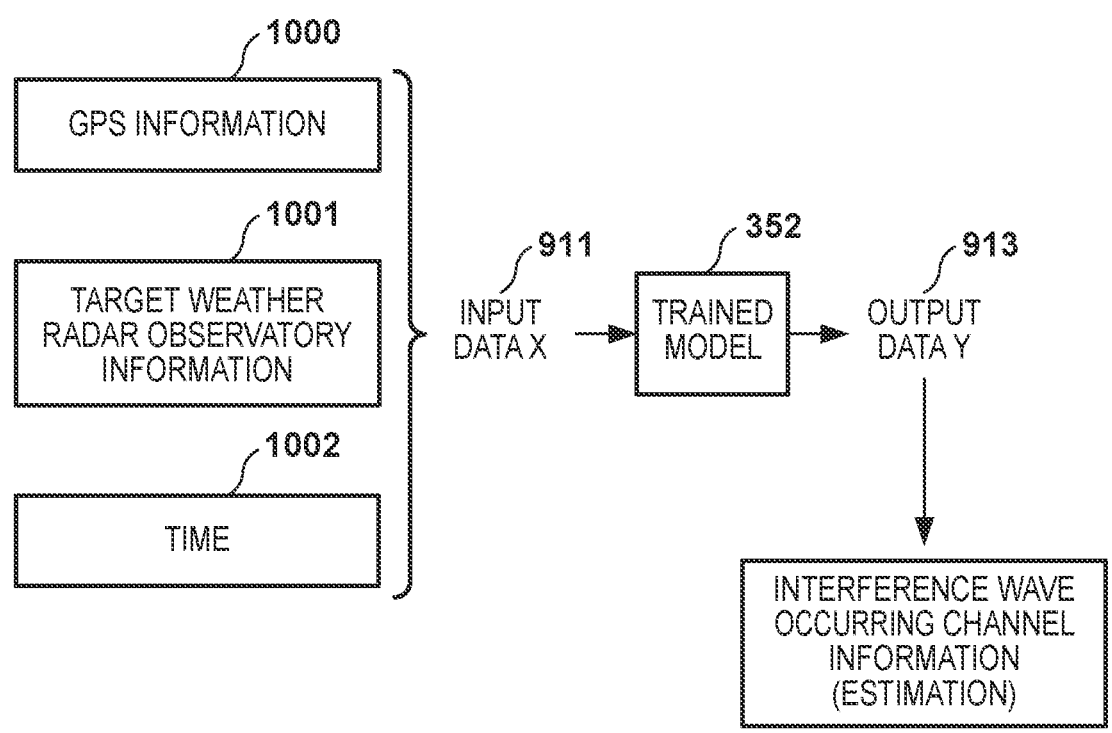
FIG. 12 is a view showing the structure of the inputs and outputs of the trained model 352 during estimation.

FIG. 12 is a view showing the structure of inputs and outputs of the trained model 352 during estimation by the edge server 300. As shown in FIG. 12, the GPS information 1000, the target weather radar observatory information 1001, and the time 1002 are used as the input data X 911 for estimation in this embodiment. Output data Y 913 which is obtained as a result of estimation by the trained model 352 is the information of the channel with the interference. Subsequently, this channel information is transmitted to the router 103, and the router 103 determines, based on this value, the channel to be used in the wireless communication.

1. Setup at Powering-On STOP

Figure 13:
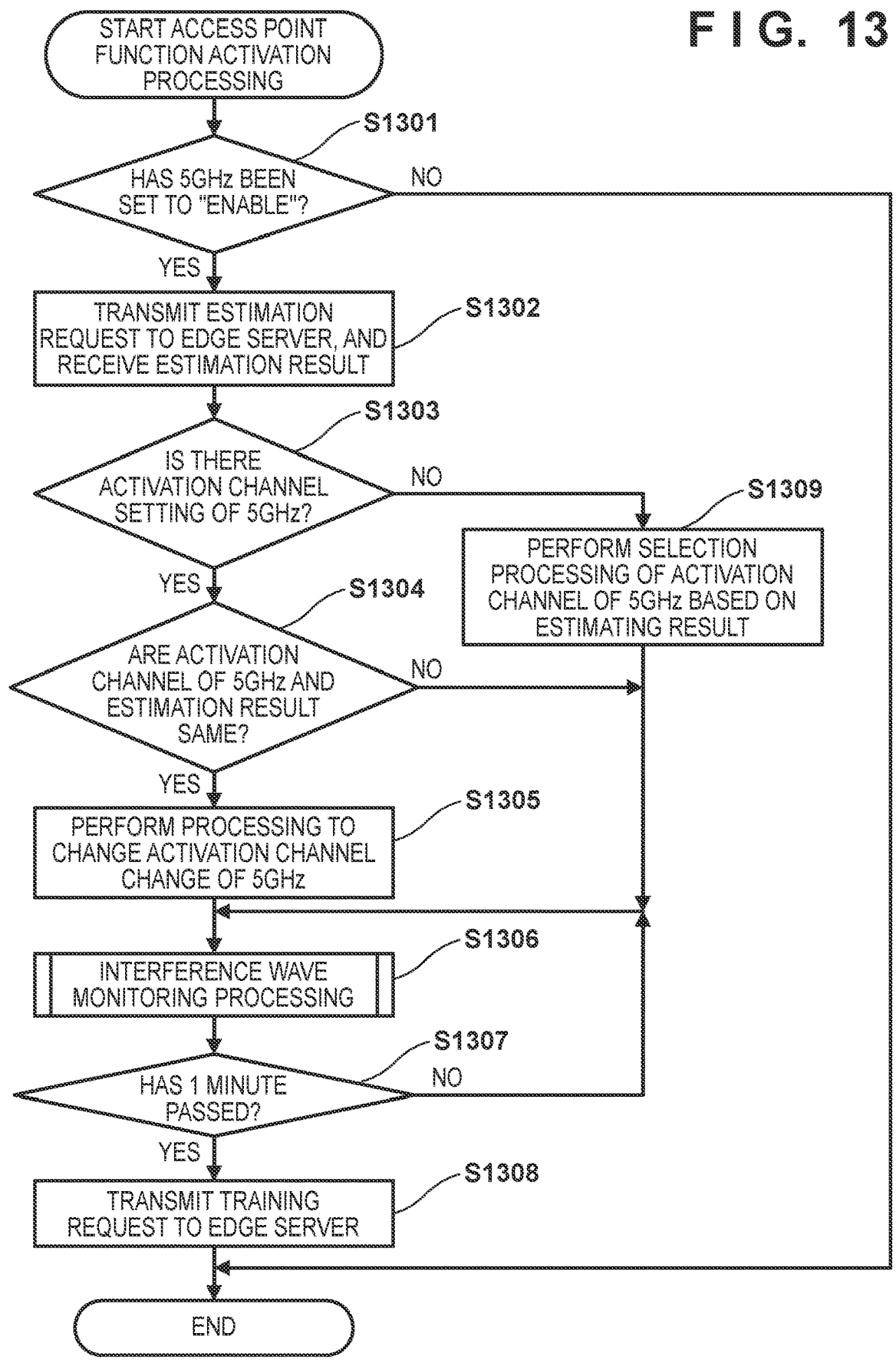

The 5 GHz band channel setting processing sequence at the time of powering-on of the router 103 will be described with reference to FIG. 13. The processing of the flowchart shown in FIG. 13 is implemented by the CPU 711 of the router 103 reading out, to the RAM, a program stored in the program memory 713 or the like and executing the program. Note that although the sequences of activation setups other than channel setting in the 5 GHz band are also processed at the time of powering-on, illustration of sequences not directly related to this embodiment has been omitted.

When power is turned on, the CPU 711 of the router 103 determines the channel to be used in wireless communication when the processing of the wireless LAN access point function is started. After the power has been turned on, the CPU determines, in step S1301, whether the 5 GHz band has been set to "enable" in the wireless LAN access point function of the router 103. As a result of this determination, if it is determined that the 5 GHz band has been set to "enable", the process advances to step S1302. On the other hand, if it is determined that the 5 GHz band has not been set to "enable", the 5 GHz band channel setting processing is ended.

In step S1302, to cause the edge server 300 to estimate an interference channel, the CPU 711 transmits an estimation request to request the edge server 300 to perform an estimation. The input data X 911 necessary for the estimation is also transmitted to the edge server 300 together with the estimation request. This input data X can be data obtained at the point when the process of step S1302 is executed. After the estimation has been completed by the edge server 300, the information of the estimated channel with the interference is received as an estimation result. A desired estimation time may be input as the time 1002 at the time of the estimation request. For example, in a case in which the current time is directly input, the interference channel at the current time can be received as the estimation result. Also, in a case in which a future time obtained by advancing the current time by a predetermined time is input as the time 1002, the interference channel at the future time can be received as the estimation result. Although the current time is input in this example, a future time can be input as a matter of course.

In step S1303, the CPU 711 determines whether there is a channel already set as the activation channel in the 5 GHz band in the wireless LAN access point function of the router 103. For example, if it is already determined as a default setting that the activation will be performed on a predetermined channel, "YES" will be determined in step S1303. Also, even in the case of specifications in which the channel which was used in a previous communication operation on the 5 GHz band will be used as the activation channel, since this previously used channels is set as the already set channel, "YES" will be determined in step S1303. As a result of this determination, if it is determined that the activation channel of the 5 GHz band is an already set channel, the process advances to step S1304. On the other hand, if it is determined that there is no channel already set as the activation channel in the 5 GHz band, the process advances to step S1309.

In step S1304, the CPU 711 compares the set activation channel of the 5 GHz band with the channel of the estimation result obtained in step S1302 to determine whether they are the same channel. As a result of this determination, if it is determined that the channels are the same channel, the process advances to step S1305. On the other hand, if it is determined that the channels are not the same channel, the process advances to step S1306. In step S1305, the CPU 711 performs processing to change the activation channel of the 5 GHz band. For example, in a case in which the set activation channel is channel 52 and the channel of the estimation result also is channel 52, the CPU 711 will change the channel to be used in the 5 GHz band to a channel different from channel 52. Subsequently, the process advances to step S1306.

In step S1309, the CPU 711 performs selection processing of the activation channel of the 5 GHz band based on the estimation result obtained in step S1302. Since the estimation result obtained in step S1302 is the information of the channel with the interference, the CPU selects a channel different from that of the obtained estimation result, and the process advances to step S1306. For example, in a case in which the channel of the estimation result is channel 52, the CPU 711 selects a channel different from channel 52.

In step S1306, the CPU 711 performs interference wave monitoring processing in the selected activation channel of the 5 GHz band. The interference wave monitoring processing will be described later with reference to FIG. 14. Subsequently, the process advances to step S1307.

In step S1307, the CPU 711 determines whether the interference wave monitoring processing has been performed for one minute. As a result of this determination, if it is determined that the monitoring processing has been performed for one minute, the process advances to step S1308. On the other hand, if it is determined that the monitoring processing has not been performed for one minute, the process of step S1306 is performed again.

In step S1308, the CPU 711 transmits a training request to the edge server 300 to execute training by the cloud server 200. At this time, the interference wave occurring channel information 1005 at this point is transmitted as the supervised data T. Also, the GPS information 1000, the target weather radar observatory information 1001, and the time 1002 are transmitted as the input data X, and the access point function activation processing is ended. Note that as described above, the interference wave presence/absence information may also be transmitted together with these pieces of information. The trained model that has been retrained and updated in accordance with the training request may be transferred at any time to the edge server 300 after each retraining or may be transferred at a predetermined timing.

Figure 14:
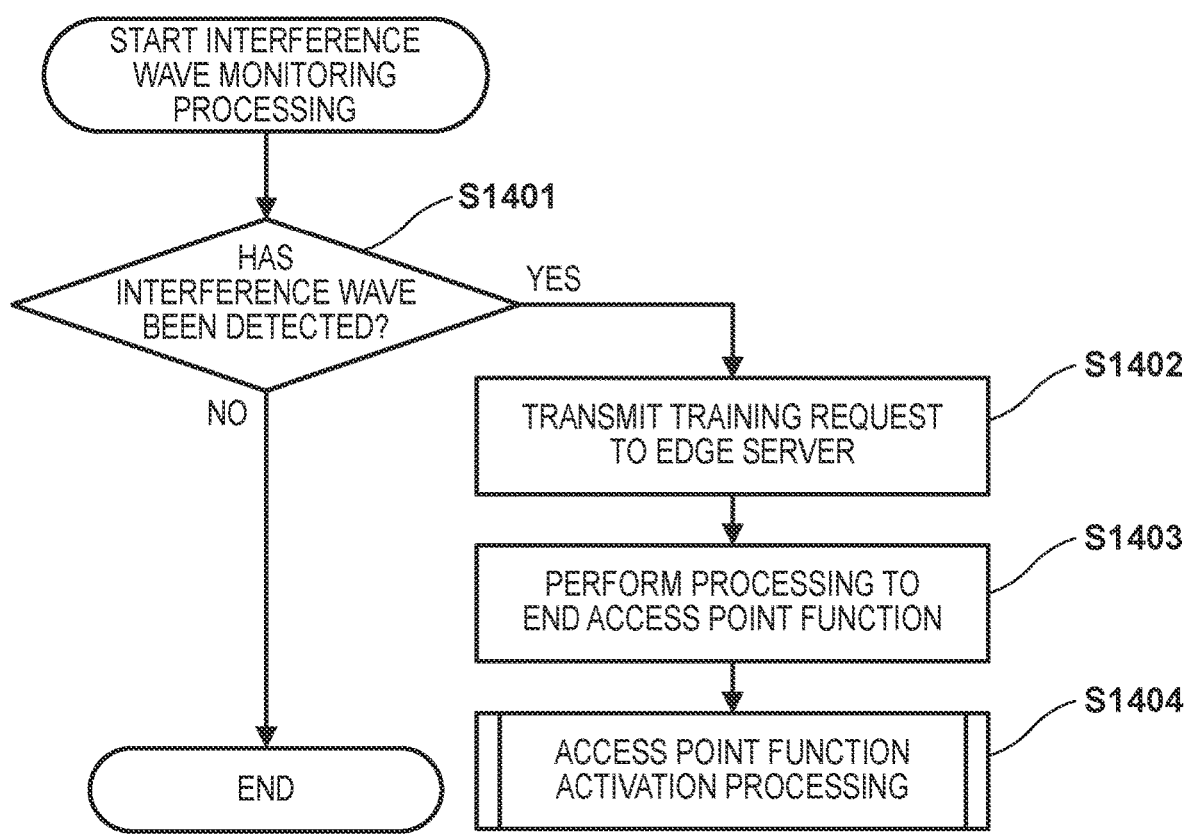
FIG. 14 is a flowchart showing interference wave monitoring processing.

FIG. 14 is a flowchart showing the contents of the interference wave monitoring processing performed in step S1306. Note that this flowchart describes the processes related to the description of this embodiment, and an illustration of other processes has been omitted. The processing of the flowchart shown in FIG. 14 is implemented by the CPU 711 of the router 103 reading out, to the RAM, a program stored in the program memory 713 or the like, and executing the program.

In step S1401, the CPU 711 determines whether interference has been detected. As a result of this determination, if it is determined that the interference has been detected, the process advances to step S1402. On the other hand, if it is determined that the interference has not been detected, the interference wave monitoring processing is ended.

In step S1402, the CPU 711 transmits a training request to the edge server 300 to execute training by the cloud server 200. At this time, the interference wave occurring channel information 1005 at this point is transmitted the supervised data T. Also, the GPS information 1000, the target weather radar observatory information 1001, and the time 1002 are transmitted as the input data X. Subsequently, the process is advanced to step S1403, processing to end the access point function is performed, and the process of step S1404 is performed.

In step S1404, processing to activate the access point function is performed. Since the processing is similar to the processing performed in steps S1301 to S1309 described above, a description of the processing will be omitted. As a result, the trained model can be updated by including a result indicating the occurrence of interference in the channel selected by using the estimation result. Subsequently, interference channel estimation using this newly trained model will be performed in the next and subsequent activation processing operations. Note that if interference is detected in step S1401, the CPU 711 will perform processing to change the channel to a channel different from that with the interference. Note that although the estimation processing is performed in step S1302 and the training processing is performed in step S1308 of FIG. 13 in this embodiment, the implementation of the present invention is not limited to this arrangement. The training processing of step S1308 may be omitted in a case in which the estimation processing has been performed in step S1302.

2. Channel Change by Manual Setting

Figure 15:
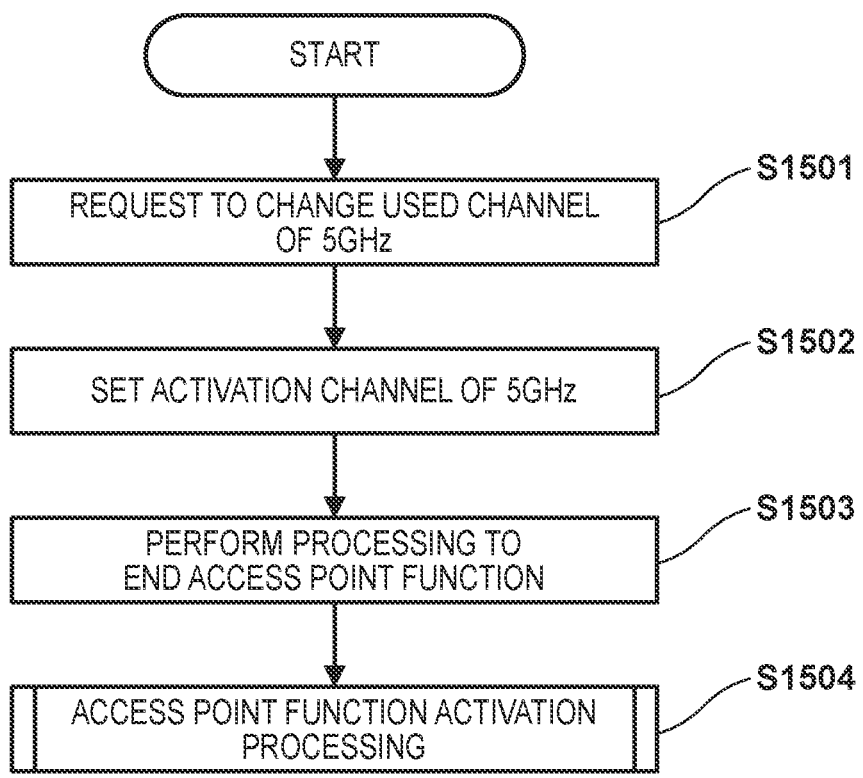
FIG. 15 is a flowchart showing channel change processing by manual setting.

The channel change processing sequence of a case in which a 5-GHz band channel change request has been made by an operation by the user with respect to the wireless LAN access point function of the router 103 will be described with reference to FIG. 15. The processing of the flowchart shown in FIG. 15 is implemented by the CPU 711 of the router 103 reading out, to the RAM, a program stored in the program memory 713 or the like and executing the program.

In step S1501, upon receiving a 5-GHz band channel change request based on a manual instruction from the user, the CPU 711 of the router 103 advances the process to step S1502. For example, channel change can be performed by accessing, via a web browser or the like of the client terminal 401, a setting page provided by a web server included in the router 103, and making the change on the setting page.

In step S1502, the CPU 711 stores, in the data memory 714, the 5-GHz band activation channel setting of the wireless LAN access point received in step S1501, and the process advances to step S1503.

In step S1503, the CPU 711 performs processing to end the access point function, and performs the process of step S1504.

In step S1504, the CPU 711 performs processing to activate the access point function. Since the processing is similar to the processing performed in steps S1301 to S1309 described above, a description of the processing will be omitted. That is, the procedure shown in FIG. 13 is executed by using, as the set activation channel, the activation channel of the 5 GHz band designated in step S1501. As a result, the possibility that this manually set channel is an interference channel will be estimated, and the channel to be used will be changed to another channel if it is determined to be an interference channel.

3. Channel Change by Interference Wave Detection

In a case in which the interference wave detection unit 721 has detected an interference wave in a state in which a channel of the 5 GHz band (DFS band) where DFS is executed is used in wireless communication, the channel must be immediately changed. The channel change processing sequence of this case will be described with reference to FIG. 16. Note that although the sequences of processing operations other than the 5-GHz band channel change processing are also processed, an illustration of sequences not directly related to this embodiment has been omitted. The procedure shown in FIG. 16 is executed by the CPU 711 or the like of the router 103.

In a case in which wireless communication is being executed on the channel of the 5 GHz band in which DFS is performed in step S1601, the CPU 711 of the router 103 will execute interference wave monitoring in step S1602. Since the interference wave monitoring processing is similar to the processing of steps S1401 to S1404 of FIG. 14, a description of this processing will be omitted. Note that if the occurrence of interference is determined by the processing of FIG. 14, the channel is immediately changed to a channel different from the channel with the interference.

Figure 16:
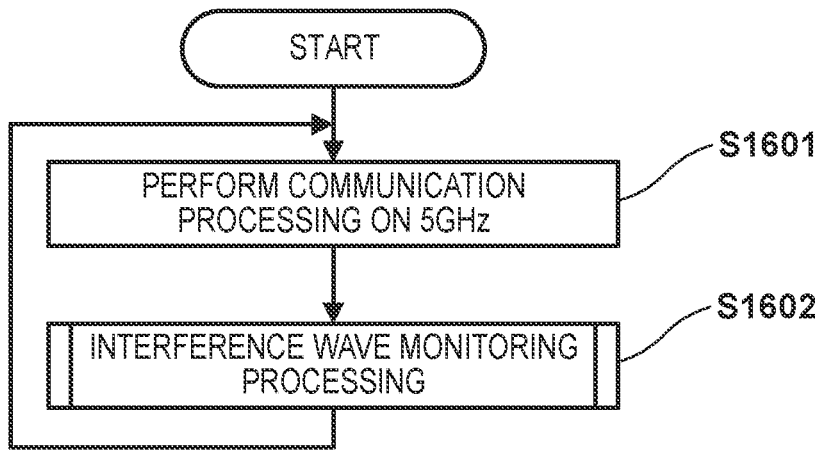
FIG. 16 is a flowchart showing a channel change by interference wave detection.

The processes of steps S1601 and S1602 are repeatedly executed by the router 103 while the power is turned on, and the processing of FIG. 16 is ended when processing to end the access point function is performed or when the power is turned off. However, the processing of FIG. 16 may be interrupted in a case in which the channel to be used has been switched to a channel of the 5 GHz band, in which DFS is not executed, due to the detection of the interference.

Channel Change Accompanying Estimation Result of Channel with Interference

Figure 17:
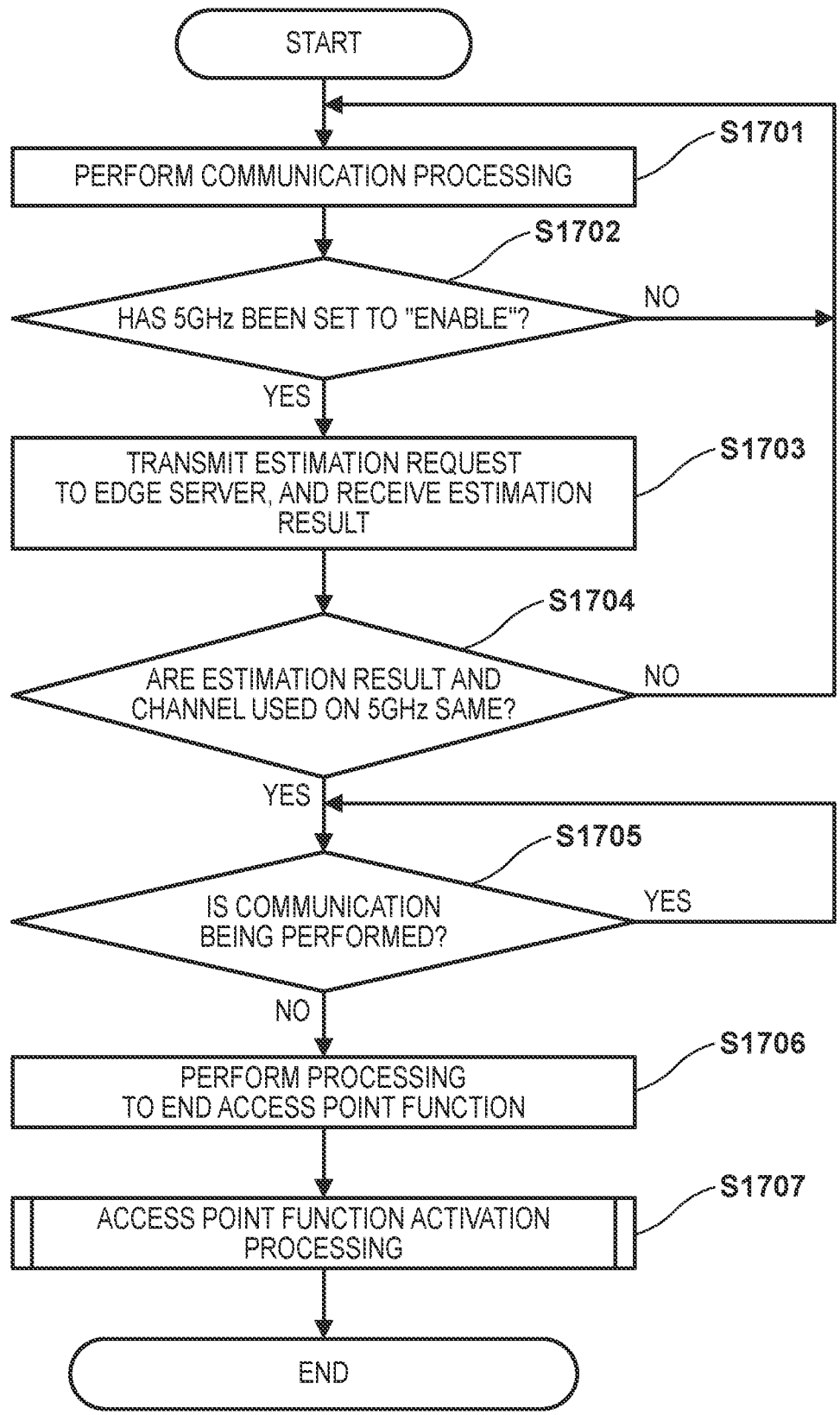
FIG. 17 is a flowchart showing a channel change that accompanies a result obtained by estimating a channel in which interference may be generated.

Estimation is performed periodically by the edge server 300 in a case in which the setting of the 5 GHz band is set to "enable" in the wireless LAN access point function of the router 103. Channel change will be performed in a case in which the channel of the estimation result and the channel used for wireless communication are the same. The processing sequence of this channel change will be described with reference to FIG. 17. The processing of FIG. 17 is executed by the CPU 711 or the like of the router 103. Also, the processing of FIG. 17 can be periodically executed, for example, after the access point function activation processing shown in FIG. 13 has been executed.

Upon determining that wireless communication is being performed in step S1701, the CPU 711 of the router 103 advances the process to step S1702. Note that if the client terminal 401 and the printer 600 are executing data communication, the process need not advance to the use channel change processing based on the estimation result and may advance to processing to change the channel at the timing in which the data communication has been completed.

In step S1702, the CPU 711 determines whether the 5 GHz band has been set to "enable" in the wireless LAN access point function of the router 103. As a result of this determination, if it is determined that the 5 GHz band has been set to "enable", the process advances to step S1703. On the other hand, if it is determined that the 5 GHz band has not been set to "enable", the process of step S1701 is repeated.

In step S1703, an estimation request is transmitted to the edge server 300 to perform an estimation by the edge server 300. The necessary input data X are also transferred to the edge server 300 together with the estimation request. In this example, the input data X may be the values obtained at the point of the execution of the process of step S1703. When the estimation by the edge server 300 has been completed, the information of the estimated channel with the interference that has been obtained as the estimation result is received.

In step S1704, the estimation result obtained in step S1702 and the channel used in the communication on the 5 GHz band are compared to determine whether these channels are the same channel. As a result of this determination, if it is determined that the channels are the same channel, the process advances to step S1705. On the other hand, if it is determined that the channels are not the same channel, the process of step S1701 is repeated.

In step S1705, the CPU determines whether communication is being actually performed on the 5 GHz band. As a result of this determination, if it is determined that communication is being performed, the process of step S1705 is repeated. The communication processing is continued during this period. On the other hand, if it is determined that communication is not being performed, the process of step S1706 is performed. In step S1706, the processing to end the access point function is performed. Subsequently, the process of step S1707 is performed.

In step S1707, the access point function activation processing is performed. Since the processing is similar to the processing of steps S1301 to S1309 of FIG. 13, a description of the processing will be omitted.

In this manner, if it is determined that the client terminal 401 and the printer 600 are executing data communication in step S1705, the process does not advance to a process beyond step S1705. Hence, the use channel change based on the estimation result will not be performed while data communication is being executed. Use channel change processing based on the estimation result will be performed by performing the ending processing and the activation processing of the access point function after the data communication has been completed.

Processing by Edge Server 300

Figure 18:
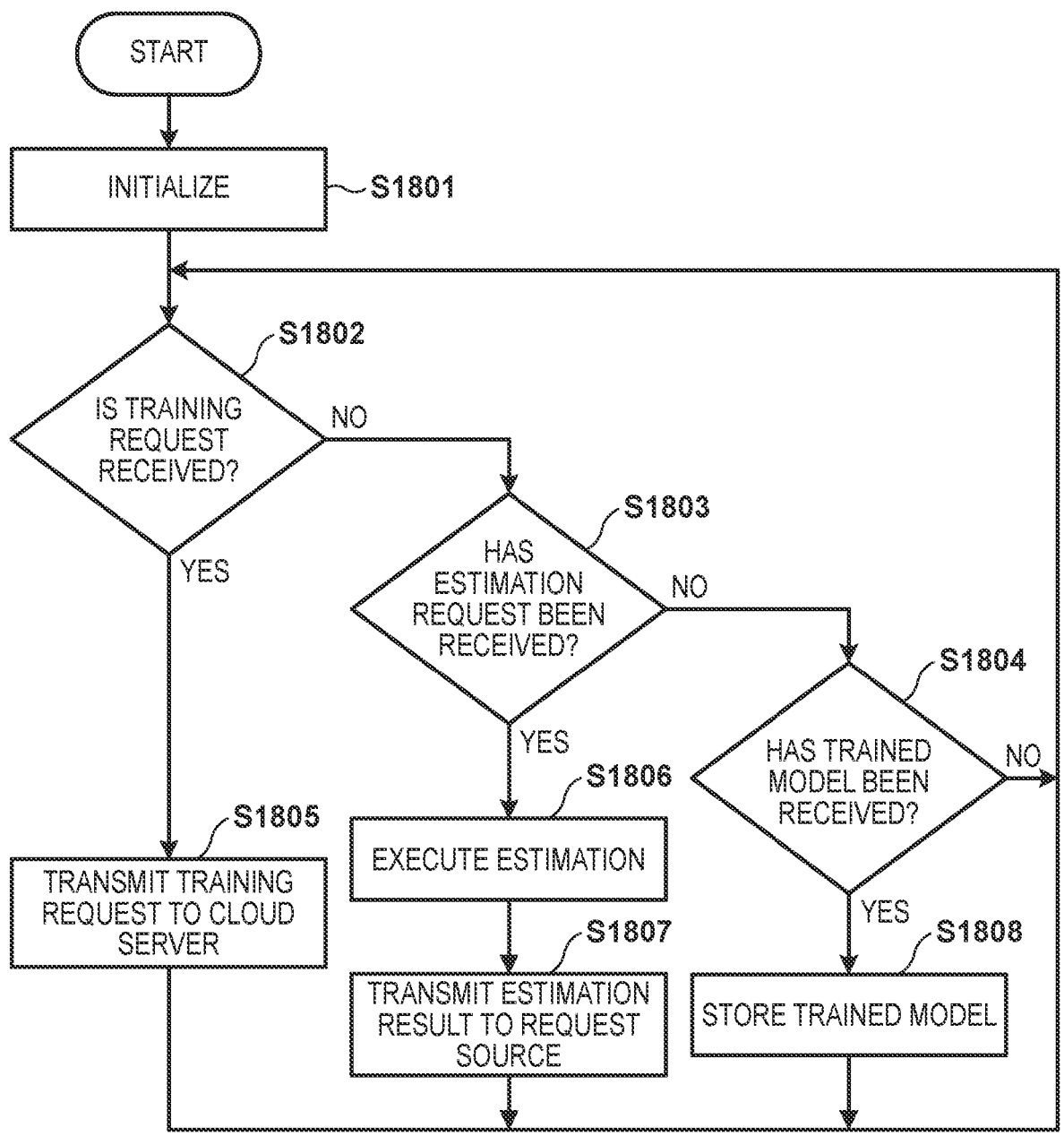
FIG. 18 is a flowchart showing the processing contents of the edge server 300.

FIG. 18 is a flowchart showing the contents of the processing performed by the edge server 300. This processing is stored in the hard disk unit 202 of the edge server 300, and is executed by the CPU 211 of the edge server 300 when the edge server 300 is activated. Note that only the processing related to the description of this embodiment is illustrated in this flowchart, and an illustration of other processing operations has been omitted. After the initialization processing of step S1801 has been executed, the reception of various kinds of instructions from the outside is checked and processing operations corresponding to the received instructions are performed in the subsequent processes of steps S1802 to S1804.

In step S1802, if it is detected that a training request has been received from the router 103, the CPU 211 advances the process to step S1805 and transmits the received training request together with the input data X as the parameters to the cloud server 200. In step S1803, if it is detected that an estimation request has been received from the router 103, the CPU 211 advances the process to step S1806 and executes the received estimation request. More specifically, the CPU 211 transmits, to the estimation module 351, the GPS information 1000, the target weather radar observatory information 1001, and the time 1002 attached to the estimation request, and executes estimation by using the trained model 352. After the execution of the estimation has been completed in step S1806, the process advances to step S1807, and the estimation result is transmitted to the router 103. In step S1804, if it is detected that a trained model that has been distributed from the cloud server 200 has been received, the CPU 211 advances the process to step S1808, reflects the information of the received trained model on the trained model 352 of the edge server 300, and stores the newly reflected model. As a result, the updated trained model 352 will be used for each subsequent estimation request.

Processing by Cloud Server 200

Figure 19:
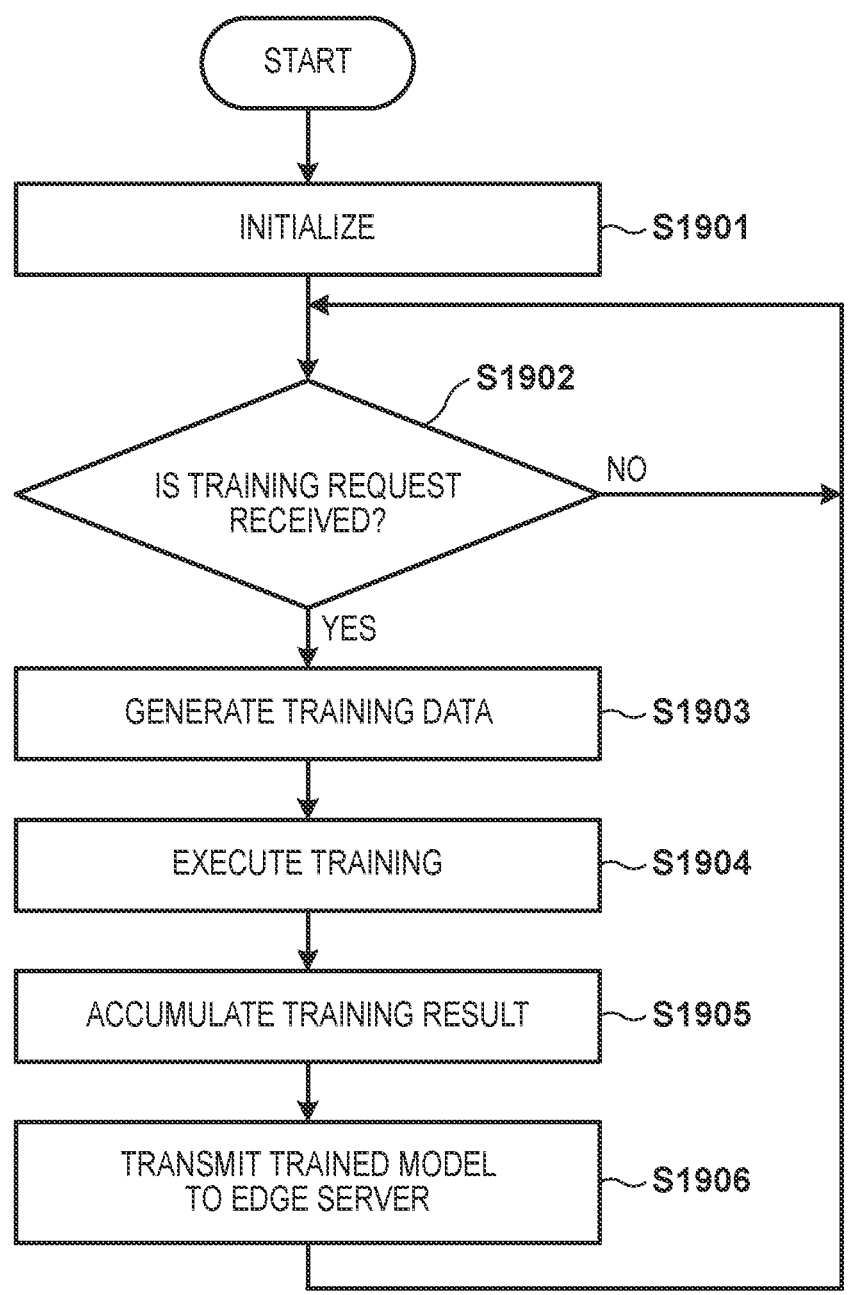
FIG. 19 is a flowchart showing the processing contents of the cloud server 200.

FIG. 19 is a flowchart showing the contents of processing performed by the cloud server 200. This processing is stored in the hard disk unit 202 of the cloud server 200, and is executed by the CPU 211 of the cloud server 200 when the cloud server 200 is activated. Note that only the processing related to the description of this embodiment is illustrated in this flowchart, and an illustration of other processing operations has been omitted.

After the initialization processing of step S1901 has been executed, the reception of an instruction from the outside is checked and a processing operation corresponding to the received instruction is performed in the subsequent process of step S1902. In step S1902, if it is detected that a training request has been received from the outside, the CPU 211 advances the process to step S1903, transmits the received training request to the training data generation module 250, and generates the training data. The training data includes, for example, the input data X and the supervised data T. The generation of training data also includes extraction of training data from the training request. Next, in step S1904, the CPU 211 executes training based on the generated training data. More specifically, the training data is transmitted to the training module 251, and training of the training model 252 is executed. The training result is reflected onto the training model 252 and accumulated in the following step S1905. After the accumulation of the training result has been completed, the process advances to step S1906, and the CPU 211 generates, from the training model 252, the trained model 352 to be distributed to the edge server 300, and transmits the generated trained model to the edge server 300. The cloud server 200 will continue to wait to receive a training request from the outside in step S1902 while the power is turned on after the execution of the initialization processing after the activation, and will end the processing of FIG. 17 when the power is turned off. Note that it has been described here that the cloud server 200 will execute training each time a training request is received. However, since the execution of training requires processing time, it may be arranged so that training will be executed non-synchronously with the reception of the training request by accumulating the received training request. In addition, although it has been described that distribution of the trained model to the edge server 300 will be performed each time the training has been performed, the trained model need not be distributed each time if a large amount of training is to be performed by the cloud server 200. It may be arranged so that the trained model will be periodically distributed or will be distributed in response by causing the edge server 300 to transmit a distribution request as needed.

In the processing of FIG. 19, the trained model 352 may be generated by preparing training data of an appropriate amount and executing training of the training data before staring the estimation of the interference channel by the edge server 300. After the trained model 352 has been generated once, the processing of FIG. 19 may be subsequently executed in accordance with a training request from the edge server 300 that is to perform the estimation of the interference channel based on the generated trained model.

By executing each of the processing operations as described above, it is possible to predict, in advance, the information of a channel in which interference can be generated, and increase the probability that a communication apparatus which has a wireless LAN access point function will be able to execute communication on a channel in which radio interference will not be generated. Note that by performing a prediction in advance, it will be possible to avoid a problem such as degradation of the communication speed or a state in which communication needs to be disconnected during the execution of communication.

[Modification]

Note that if the output period of the radar by the weather radar observatory can be known in advance, training can be performed with respect to the interference channel of that output period. That is, instead of the router 103 making a training request only at the time of the occurrence of the interference, the router 103 can periodically transmit the GPS information 1000, the target weather radar observatory information 1001, the time 1002, and the interference wave occurring channel information 1005. Also, even in a case in which information is periodically transmitted in this manner, the router 103 will need not transmit the interference wave presence/absence information, which indicates the presence/absence of interference, together with the aforementioned pieces of information.

In this example, the timing for estimating the interference channel is the timing at which the weather radar is used. Hence, when an estimation request is received in the above-described embodiment, the edge server 300 will determine whether the timing which has been indicated by the time 1002 as a piece of the input data X overlaps the output timing of the weather radar, estimate the interference channel if an overlap is determined, and transmit the estimation result to the router 103. If it is determined that there is no overlap, estimation using the trained model 352 need not be performed, and a response indicating the absence of interference can be transmitted to the router 103. The information of the occurrence period of the interference wave of the weather radar or the like can be from the output source in advance, and the information can be held in the cloud server 200 or the edge server 300.

Second Embodiment

Although the second embodiment is based on the first embodiment, particularly, the modification described above, the second embodiment differs from the first embodiment in the retraining timing. In the first embodiment, step S1308 of FIG. 13 and step S1402 of FIG. 14 are the timings at which a trained model 352 that was once generated and used for estimation will be updated (that is, retrained). That is, in a case in which the setting channel at the time of activation and the channel of the estimation channel match and channel change has been performed, retraining is performed in step S1402 if interference is determined to be present, and retraining is performed in step S1308 if interference is determined not to be present. In contrast, in this embodiment, a training request is issued from a router 103 to an edge server 300 when a predetermined condition has been satisfied. Input data X and supervised data T used in this case are similar to those used in the first embodiment.

The predetermined condition in this case is a state in which a channel that has been set as the channel currently used in the router 103 is receiving interference. This condition corresponds to, for example, a case in which interference is detected by an interference wave detection unit 721. In this case, the router 103 will obtain the input data X and the supervised data T in a manner similar to the first embodiment, and will issue a training request to the edge server 300 together with these data. The edge server 300 will transfer the training request to a cloud server 200, and the cloud server 200 will, in response to the training request, update a training model 252 by inputting the input data X to the training model 252 and adjusting a weight coefficient of the neural network in accordance with a difference between output data Y, obtained from the training model, and the supervised data T. The cloud server 200 will generate the updated trained model 352 from the updated training model 252 and transfer the updated trained model to the edge server 300, and the edge server 300 will use the transferred updated trained model for subsequent interference channel estimation. The generation and transferring of the trained model 352 to the edge server 300 may be performed at each update or may be performed at an appropriate timing (for example, at a predetermined cycle) when the updated trained model has been accumulated.

As a result, training can be performed efficiently since training with respect to an interference channel can be performed in a case in which the occurrence of interference can be predicted. Hence, improvement of estimation accuracy can be expected.

Third Embodiment

Figure 20:
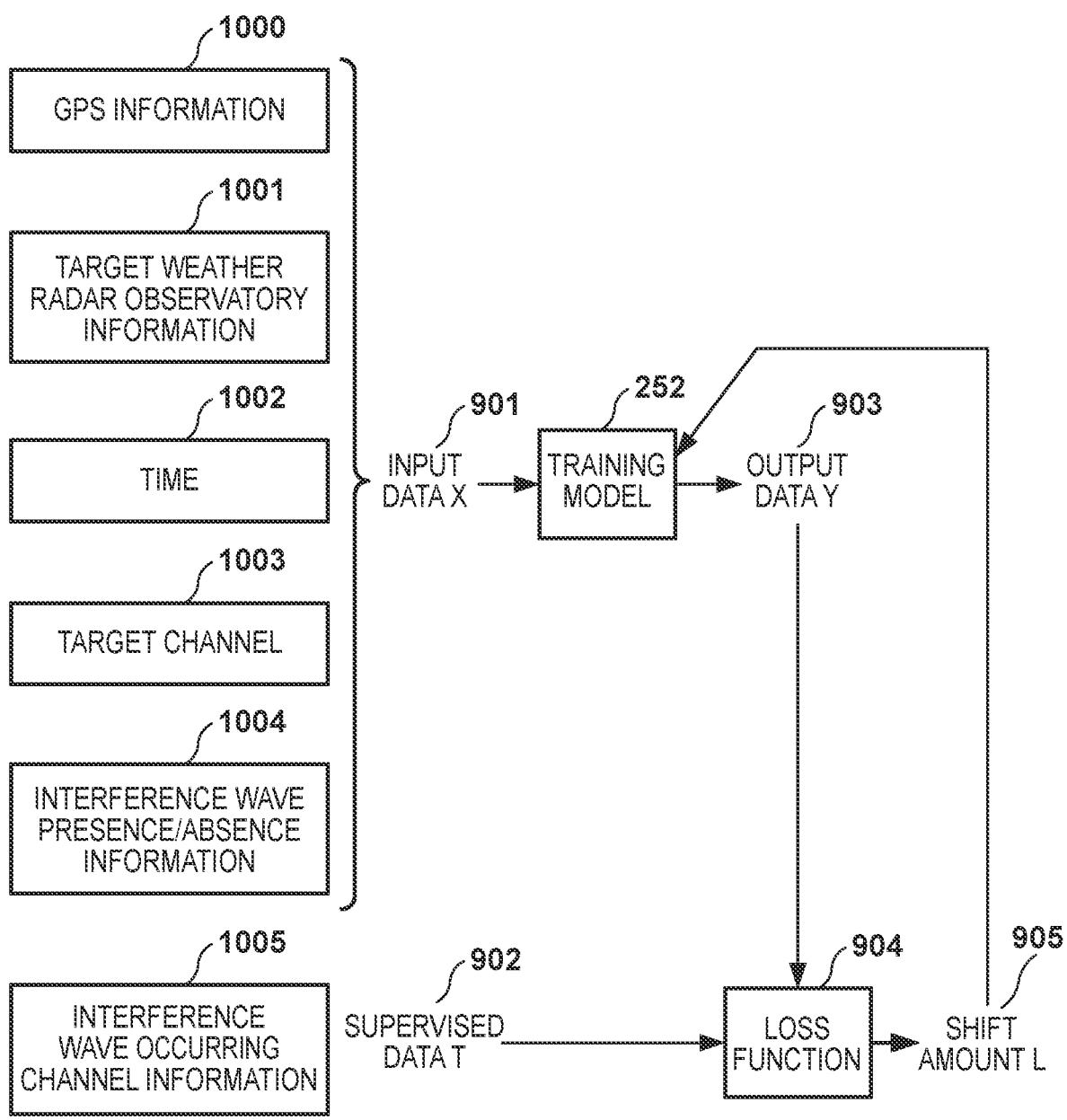
FIG. 20 is a view showing the structure of inputs and outputs of a training model 252 during training.

FIG. 20 is a view showing the structure of inputs and outputs of a training model 252 during training. As shown in FIG. 20, as input data X used for training, data of a target channel 1003 and interference wave presence/absence information 1004 are used in addition to GPS information 1000, target weather radar observatory information 1001, and a time 1002 used in the first embodiment. The target channel 1003 uses, for example, a channel number or the like to indicate a channel currently selected by a wireless LAN router 103. The interference wave presence/absence information 1004 indicates whether an interference wave is currently generated from a weather radar observatory or the like. This information can use a binary value to indicate whether an interference wave is being generated. The data of the target channel 1003 and the data of the interference wave presence/absence information 1004 are obtained by a wireless LAN communication control unit 715 and an interference wave detection unit 721, respectively, of the wireless LAN router 103, and transmitted as a part of the input data X to a cloud server 200 via an edge server 300.

Also, interference wave occurring channel information 1005 is used as supervised data T. However, the contents of this interference wave occurring channel information differ from those of the first embodiment, and a channel with the possibility of the occurrence of interference is designated. For example, if interference is not present in the channel used by the router 103, it can be assumed that interference is being generated in one of the other channels of the DFS band. Hence, the interference wave occurring channel information 1005 will indicate a channel which is the same channel as the target channel as the used channel if interference has been generated in the channel (that is, the channel indicated by the target channel 1003) currently used by the router 103, and will indicate a channel with a possibility of the occurrence of interference among the channels other than the target channel if interference is has not been generated in the currently used channel. In this case as well, the input data X for estimation may be similar to that shown in FIG. 12. In addition, other arrangements and the training timing may be similar to the modification of the first embodiment and the second embodiment.

As a result, even in a case in which the target channel (that is, the current setting channel) is not receiving interference, it will be possible to perform training based on the fact that interference is occurring in one of the other channels, and the estimation accuracy of an interference channel can be further improved.

OTHER EMBODIMENTS

The present invention can also be implemented by processing of supplying a program configured to implement at least one function of the above-described embodiments to a system or an apparatus via a network or a storage medium and reading out and executing the program by at least one processor in a computer of the system or the apparatus. The computer can include one or a plurality of processors or circuits, and a plurality of separate computers or a plurality of separate processors or circuits of a network can be included to read out and execute a computer executable instruction.

The processor or the circuit can include a central processing unit (CPU), a micro processing unit (MPU), a graphics processing unit (GPU), an application-specific integrated circuit (ASIC), and a field-programmable gate array (FPGA). The processor or the circuit can also include a digital signal processor (DSP), a data flow processor (DFP), or a neural processing unit (NPU).

A storage medium can also be referred to as a non-transitory computer-readable storage medium. The storage medium can also include one or a plurality of hard disks (HD), a random-access memory (RAM), a read-only memory (ROM), and a storage device of a distributed computing system. The storage medium can also include an optical disk (for example, a compact disc (CD), a digital versatile disc (DVD), or a Blu-ray disc (BD®)), a flash memory device, and a memory card.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141684, filed Jul. 31, 2019 which is hereby incorporated by reference herein in its entirety.

What is claimed is:

1. A communication apparatus that performs wireless communication using a channel of a plurality of channels, comprising:
   at least one memory including instructions; and
   at least one processor to execute the instructions, with the instructions being executed to:
   obtain information of a channel with a possibility of interference in wireless communication that is output based on position information of the communication apparatus, position information of a source of a radio wave which has a possibility of interference in the wireless communication, and time information;
   select, based on the obtained channel information, a channel to be used in the wireless communication,
   wherein it is determined whether a channel corresponding to the obtained channel information is the same channel as a currently selected channel, and the currently selected channel is changed to a channel other than the channel corresponding to the obtained channel information if the channel corresponding to the obtained channel information is the same channel as the currently selected channel, and
   wherein if communication is being performed, it is determined after the communication whether the channel corresponding to the obtained channel information is the same channel as the currently selected channel.

2. The apparatus according to claim 1, wherein after communication is started in the selected channel, interference in the channel is monitored, a training request, in which a position of the communication apparatus, a position of a closest source of an interference wave, and a current time are included as input data and an interfered channel receiving the interference is set as supervised data, is transmitted to an external apparatus having a learning function in a case in which the interference is detected, an updated trained model corresponding to the training request is received from the external apparatus, and the updated trained model that has been received is used as the trained model.

3. The apparatus according to claim 1, wherein a current time is used as the time information.

4. The apparatus according to claim 1, wherein a future time is used as the time information.

5. A control method executed by communication apparatus that performs wireless communication using a channel of a plurality of channels, the method comprising:
   estimating information of a channel in which an interference wave is generated in the wireless communication by using a trained model with respect to input data which includes a position of the communication apparatus as position information of the communication apparatus, a position of a closest source of an interference wave to the communication apparatus as position information of the source of the interference wave, and an estimation time as time information;
   selecting, from the plurality of channels, a channel other than a channel indicated by the estimated channel information; and
   performing communication on the selected channel,
   wherein the trained model is a trained model for causing a computer to function to estimate an interference channel when the wireless communication is to be performed in one of the plurality of channels,
   a weight coefficient of a neural network forming the trained model is trained by using, as training data, input data which includes the position information of the communication apparatus performing the wireless communication, the position information of the source of the interference wave, and the time information and supervised data which includes the information of a channel in which the interference wave is generated in the wireless communication, and
   the computer is made to function, with respect to the input information which includes the position information of the communication apparatus, the position information of the source of the interference wave, and the time information, to output, from an output layer of the neural network, the information of a channel in which the interference wave is generated in the wireless communication.

6. A communication system comprising:
   a wireless communication apparatus configured to perform wireless communication as a master station in a wireless LAN;
   at least one memory including instructions; and
   at least one processor to execute the instructions, with the instructions being executed to:
   generate a trained model for estimating an output; and
   perform estimation by using the trained model,
   wherein trained model is generated by using, as input data, position information, position information of a source of an interference wave, a time, a target channel, and information indicating presence/absence of interference wave, using, as supervised data, information of a channel in which the interference wave has been generated, and optimizing a training model so as to minimize a shift between the supervised data and information of a channel in which the interference wave is generated that has been estimated from the input data, and the information of the channel in which the interference wave is generated is estimated by using, as the input data, position information of the wireless communication apparatus, position information of a closest source of the interference wave to the wireless communication apparatus, and the time.

7. The system according to claim 6, wherein the instructions are further executed to:
   determine a setting channel to be used, based on the information of the channel in which the interference wave that has been estimated is generated;
   detect an interference wave in a channel used in the wireless communication; and
   control the setting channel based on the interference wave detected.

8. The system according to claim 7, wherein the setting channel is determined so as not to use the channel in which the interference wave that has been estimated is generated.

9. The system according to claim 7, wherein in a case in which a specific channel has been selected and the specific channel is the same channel as the channel in which the interference wave that has been estimated is generated, the setting channel is changed to a channel which is different from the specific channel.

10. The system according to claim 7, wherein the information of the channel in which the interference wave is generated is obtained by periodically performing estimation after the channel to be used has been determined, and changes the setting channel in a case in which the channel in which the interference wave is generated is the same channel as a current setting channel.

11. The system according to claim 9, wherein in a case in which the wireless communication is being performed, the setting channel is changed after the wireless communication has ended.

12. The system according to claim 7, wherein the setting channel is changed in a case in which an interference wave is detected.

13. The system according to claim 7, wherein any one of the frequency bands among a first frequency band and a second frequency band which includes a specific frequency band can be set as a frequency band to be used in communication by the wireless communication apparatus, and information of the channel in which the interference wave is generated is estimated and obtained in a case in which the second frequency band is set.

14. The system according to claim 13, wherein the first frequency band is a 2.4 GHz frequency band and the second frequency band is a 5 GHz frequency band.

15. The system according to claim 13, wherein the specific frequency band is a frequency band that requires the application of a DFS (Dynamic Frequency Selection) function of the 5 GHz frequency band.

\* \* \* \* \*